(12) United States Patent
Imamura et al.

(10) Patent No.: US 7,503,246 B2
(45) Date of Patent: Mar. 17, 2009

(54) SLIDE TYPE MITER SAW

(75) Inventors: Ryuichi Imamura, Hitachinaka (JP); Takamoto Horiuchi, Hitachinaka (JP); Shigeharu Ushiwata, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 65 days.

(21) Appl. No.: 10/925,993

(22) Filed: Aug. 26, 2004

(65) Prior Publication Data

US 2005/0056131 A1 Mar. 17, 2005

(30) Foreign Application Priority Data

Aug. 28, 2003 (JP) ............................ P2003-305351

(51) Int. Cl.
*B26D 1/16* (2006.01)
*B26D 3/02* (2006.01)

(52) U.S. Cl. ............................. 83/529; 83/473; 83/490

(58) Field of Classification Search ................ 83/471.1, 83/581, 473, 490, 477.2, 477.1, 529, 530
See application file for complete search history.

(56) References Cited

U.S. PATENT DOCUMENTS 4,869,142 A * 9/1989 Sato et al. .................. 83/467.1
5,033,343 A * 7/1991 Gerber ........................... 83/74
5,791,224 A * 8/1998 Suzuki et al. .................. 83/488
5,839,339 A * 11/1998 Sasaki et al. ............... 83/471.3

FOREIGN PATENT DOCUMENTS

| JP | 4-201011 | 7/1992 |
| JP | 6-71603 | 3/1994 |
| JP | 11-34002 | 2/1999 |
| JP | 2001-300901 | 10/2001 |

* cited by examiner

*Primary Examiner*—Kenneth E. Peterson
*Assistant Examiner*—Phong Nguyen
(74) *Attorney, Agent, or Firm*—Antonelli, Terry, Stout & Kraus, LLP.

(57) ABSTRACT

A slide type miter saw capable of easily switching operation mode between groove forming mode and ordinary cutting mode without generation of fluffs and cracks at an upper surface of a workpiece. A circular-saw unit supporting a circular saw blade has a first stopper bolt abuttable on a stopper receiver on a support unit for determining the lowermost position of the circular saw blade. The circular-saw unit also has a second stopper bolt for forming a groove of a desired depth in the workpiece. The second stopper bolt is movable with respect to the first stopper bolt. The stopper receives supports a pivot member or a plate. The pivot member or the plate is abuttable on the second stopper bolt in accordance with a moved position of the second stopper bolt for regulating a depth of a groove.

19 Claims, 17 Drawing Sheets

SLIDE TYPE MITER SAW

BACKGROUND OF THE INVENTION

The present invention relates to a slide type miter saw, and more particularly, to such a miter saw whose circular-saw unit is movable frontward and rearward and pivotally movable up and down with respect to an upper surface of a base.

Hitherto, a slide type miter saw having a base and a circular-saw unit has been known. The circular-saw unit is movable frontward and rearward and pivotally movable up and down with respect to an upper surface of a base. A workpiece is mounted on the upper surface of the base to be cut with a circular saw blade provided in the circular-saw unit. Laid open Japanese Patent Application Publication No. 2001-300901 discloses a miter saw having a stopper that defines the lowermost position of the circular-saw unit, thus preventing the circular-saw unit from excessively moving downward into the base.

Generally, a slide type miter saw cuts a workpiece in such a way as is depicted in FIG. 33. The miter saw 101 has a base 110 and a circular saw blade 121. In FIG. 33, the back of the base 110 is shown on the left, and the front of the base 110 on the right. While the circular saw blade 121 rotates clockwise as seen in FIG. 33 the circular saw blade 121 moves from the front of the base 110 toward the back of the base 110, to cut the workpiece W held on the base 110. This method of cutting the workpiece W is called "upper cutting." A cutting force is applied in the direction in which the wood fibers move away from the workpiece W. Inevitably, fluffs and edge cracks will be generated at the upper surface of the workpiece W. Reducing fluffs and edge cracks as much as possible is important, particularly in cutting decorative plywood plates that should preserve good outer appearance.

To reduce fluffs and edge cracks, the workpiece W is positioned such that its obverse surface contacts the base 110, thus mounted upside down on the base 110. In this case, the miter saw 101 performs "down cutting" at the obverse surface of the workpiece W facing the base 110. In this method, however, the obverse surface of the workpiece W faces downwards. Consequently, the user of the miter saw 101 cannot observe a cutting line provisionally marked on the obverse surface of the workpiece W. Thus, the user may often fail to align the circular saw blade with the cutting line.

Another method for reducing fluffs and end cracks has been proposed in which a very shallow groove is provisionally formed along the cutting line in the obverse surface of the workpiece W. If the workpiece W is cut along this groove while the groove is positioned at the upper surface, generation of fluffs or edge cracks can be restrained in the upper surface of the workpiece W, in spite of the force acting in the direction in which the wood fibers move away from the workpiece W.

Another cutting method, known as "groove forming" has been practiced hitherto. In this method, a groove of a desirable depth, not a shallow groove, is cut in the obverse surface of the workpiece. Laid open Japanese Patent Application Nos. H6-71603, H11-34002 and H4-201011 disclose slide type miter saws that can easily accomplish the groove forming. These miter saws are provided with a stop device as well as the stopper. The stopper defines the lowermost position of the vertically movable circular-saw unit so as to prevent the circular-saw unit from excessively moving downwards for cutting the workpiece into two pieces. The stopper device is adapted for regulating a vertical position of the circular saw unit in order to form a groove of a desired depth in the upper surface of the workpiece.

The stop device includes an adjusting bolt. The adjusting bolt is turned to control a depth of the groove in the upper surface of the workpiece W so as to provide a groove of a desired depth. With these miter saws, the stop device for forming a groove can be switched between an operative state and an inoperative state. Thus, each miter saw can be switched between the groove-forming mode and the workpiece-cutting mode.

According to the laid open Japanese Patent Application Publication Nos. H6-71603 and H11-34002, if the groove forming is to be performed on a thin workpiece, the adjusting bolt of the stopper device must be held at a relatively high position and the circular-saw unit is held at a low position, in order to form a groove in the upper surface of the thin workpiece. On the other hand, if the workpiece is thick, the adjusting bolt must be held at a relatively low position and the circular-saw unit is held at a high position, to cut a groove in the upper surface of the thick workpiece. Therefore, large moving stroke of the adjustment bolt is required, and as a result, much labor and time are required to operate the miter saws.

In the miter saw disclosed in the laid open Japanese Patent Application Publication No. H4-201011, the stopper device has a plurality of steps to provide a plurality of stop positions. Hence, a groove can be easily formed in the upper surface of the workpiece to various depths dependent on the selection of one of the steps. However, the adjusting bolt of the stopper device must be moved back to a position equivalent to the lowermost position of the circular saw unit each time the circular-saw unit is to be moved to its lowermost position for the workpiece cutting mode. Such work for moving the adjusting bolt is cumbersome. Such cumbersome work may also be necessary in order to form a shallow groove in the obverse surface of the workpiece to reduce fluffs and edge cracks as described above.

SUMMARY OF THE INVENTION

It is therefore an object of the present invention to provide a slide type miter saw that can cut a workpiece without making fluffs or edge cracks on the upper surface of the workpiece in spite of the upper cutting.

Another object of the present invention is to provide such a slide type miter saw capable of facilitating switching between the groove-forming mode and ordinary workpiece cutting mode and switching between a mode of cutting a thin workpiece and a mode of cutting thick workpiece.

These and other objects of the present invention will be attained by providing a slide type miter saw including a base on which a workpiece is to be mounted, a support unit, a circular-saw unit, an abutment unit, and an abutment receiving unit provided on the support unit for determining a lowermost position of the circular saw blade, the abutment receiving unit. The support unit is slidably movable in frontward/rearward direction with respect to the base. The circular-saw unit is pivotally connected to the support unit by a pivot shaft. A circular-saw blade is attached to the circular-saw unit. The abutment unit is provided on the circular-saw unit and includes a first abutment section and a second abutment section having an abutment shaft extending in a direction substantially perpendicular to the pivot shaft and movable in an axial direction of the abutment shaft relative to the first abutment section. The abutment receiving unit is provided on the support unit for determining a lowermost position of the circular saw blade. The abutment receiving unit includes a first abutment receiving section on which the first abutment section is abuttable when the circular-saw unit pivotally moves toward the base, a second abutment receiving section on which the second abutment section is abuttable when the circular-saw unit pivotally moves toward the base, and a third abutment receiving section having a predetermined thickness and selectively movable to a position superposed with the second abutment receiving section so that the second abutment section is selectively abuttable on the third abutment receiving section when the circular-saw unit pivotally moves toward the base.

By displacing the third abutment receiving section from the second abutment receiving section, the second abutment section is abuttable to the exposed second abutment receiving section. Therefore, a groove can easily be formed in an upper surface of a first kind workpiece. On the other hand by superposing the third abutment receiving section with the second abutment receiving section, the second abutment section is abuttable on the third abutment receiving section. Therefore, a groove can be easily formed in an upper surface of a second kind workpiece that is thicker than the first kind workpiece. Even though the abutment shaft is axially movable relative to the first abutment section, the abutment shaft need not be moved by a difference in thickness between the first and second kind of workpieces. The abutment shaft can be automatically positioned higher by the thickness of the third abutment receiving section. Hence, the axially moving amount of the abutment shaft can be reduced by the corresponding thickness of the third abutment receiving section. This can enhance the efficiency of forming grooves in workpieces whose thickness are different from each other.

Further, even when the circular saw blade performs upper cutting, neither fluffs nor cracks will be formed at the upper surface of the workpiece as long as the groove having a desired depth is provisionally formed in the upper surface of the workpiece. Thus, no fluffs nor cracks will be formed at the upper surface of the workpiece even during upper-cutting the workpiece in a state where the first abutment section is in abutment with the first abutment receiving section, after forming the groove at the upper surface. Therefore, the workpiece need not be turned upside down as in the case of cutting the workpiece with the conventional miter saw. Since the workpiece need not be turned upside down, the actual cut line can be easily aligned with the mark line.

Preferably, the second abutment section is movable between a first position and a second position relative to the circular saw unit. Only the first abutment section is abuttable on the first abutment receiving section when the second abutment section lies in the first position. Only the second abutment section is abuttable on one of the second abutment receiving section and the third abutment receiving section when the second abutment section lies in the second position. If the second abutment section is moved to its first position, the workpiece can be cut. If the second abutment section is moved to its second position and abuts on the second abutment receiving section, a groove can easily be formed in the first kind workpiece. If the second abutment section is moved to its second position and abuts on the third abutment receiving section, a groove can easily be formed in the second kind workpiece.

In the above-construction, the second abutment receiving section is flush with the first abutment receiving section in an identical horizontal plane. Namely, the first and second abutment receiving sections can be provided at one flat surface of an identical member. This helps to reduce the cost of manufacturing the abutment receiving unit.

Preferably, the third abutment receiving section includes a pivot member pivotally movably connected to the support unit. The pivot member is movable between a first pivot position providing a direct contact of the abutment shaft of the second abutment section with the pivot member and a second pivot position permitting the abutment shaft to directly contact with the second abutment receiving section. With this arrangement, if the pivot member is pivotally moved to the first pivot position, a groove can be formed in the second kind workpiece. If the pivot member is pivotally moved to the second pivot position, a groove can be formed in the first kind workpiece that is thinner than the second kind workpiece.

Preferably, the second abutment receiving section is flush with the first abutment receiving section in an identical horizontal plane. The third abutment receiving section includes a horizontally movable member movable along a surface of at least the second abutment receiving section. The horizontally movable member is movable between a first slide position providing a direct contact of the abutment shaft of the second abutment section with the horizontally movable member and a second slide position permitting the abutment shaft to directly contact with the second abutment receiving section.

With this arrangement, if the horizontally movable member is moved to the first slide position, a groove can be formed in the second kind workpiece. If the horizontally movable member is moved to the second slide position, a groove can be formed in the first kind workpiece that is thinner than the second kind workpiece.

Preferably, the third abutment receiving section includes a horizontally movable member having an upper surface positioned at a level higher than an upper surface of the second abutment receiving section. The horizontally movable member is slidable between a first slide position and a second slide position along the upper surface of the second abutment receiving section. The first slide position permits the abutment shaft of the second abutment section to directly contact with the upper surface of the horizontally movable member for positioning a lowest part of the circular saw blade coincident with an upper surface of the workpiece. The second slide position permits the abutment shaft to directly contact with the second abutment receiving section for automatically defining a depth of a groove to be formed on the workpiece. In this case, the third abutment receiving section further includes a pivot member pivotally movably connected to the support unit. The pivot member is movable to a position to contact with the upper surface of the horizontally movable member while the horizontally movable member remains at the first slide position for positioning a lowest part of the circular saw blade coincident with an upper surface of the workpiece. The pivot member is also movable to another position to directly contact with the second abutment receiving section avoiding interference with the horizontally movable member as a result of shifting the horizontally movable member to the second slide position for automatically defining a depth of a groove to be formed on the workpiece.

With this arrangement, the depth of the groove to be formed in the first or second kind workpiece can be automatically determined by the difference in height between the upper surface of the third abutment receiving section and the upper surface of the second abutment receiving section with respect to the vertical direction.

Preferably, the third abutment receiving section includes a pivotable block pivotally movable in a horizontal plane for selectively superposing with the second abutment receiving section. With this arrangement, the second abutment section can selectively abut on either the surface of the second abutment receiving section or the surface of the third abutment receiving section. In this arrangement, the third abutment receiving section further includes a blade position regulating plate pivotally movable in a horizontal plane and disposed upon the pivotable block for selectively superposing with the pivotable block. With this arrangement, the depth of the groove to be formed in the second kind workpiece can be automatically determined by the difference in height between the upper surface of the blade position regulating plate and the upper surface of the third abutment receiving section.

In another aspect of the present invention, there is provided a slide type miter saw including a base on which a workpiece is to be mounted, a support unit, a circular-saw unit, an abutment unit, an abutment receiving unit, and an auxiliary abutment receiving unit. The support unit is slidably movable in frontward/rearward direction with respect to the base. The circular-saw unit is pivotally connected to the support unit by a pivot shaft. A circular-saw blade is attached to the circular-saw unit. The abutment unit is provided on the circular-saw unit and extends in a direction substantially perpendicular to the pivot shaft and is movable in the direction with respect to the circular-saw unit. The abutment receiving unit is provided on the support unit for determining a lowermost position of the circular saw blade when the abutment unit abuts the abutment receiving unit as a result of pivot movement of the circular saw blade toward the base. The auxiliary abutment receiving unit is provided on the support unit and is selectively interposed between the abutment unit and the abutment receiving unit when the circular-saw unit pivotally moves toward the base for providing abutment of the abutment unit on a selected one of the abutment receiving unit and the auxiliary abutment receiving unit.

By displacing the auxiliary abutment receiving unit from the abutment receiving unit, the abutment unit becomes abuttable on the exposed abutment receiving unit. In this state, a groove can easily be formed in the upper surface of the first kind workpiece. On the other hand, by superposing the auxiliary abutment receiving unit with the abutment receiving unit, the abutment unit becomes abuttable on the auxiliary abutment receiving unit. In this state a groove can be easily formed in the upper surface of the second kind work-piece that is thicker than the first kind workpiece.

Even though the abutment shaft is axially movable, the abutment shaft need not be moved by a difference in thickness between the first and second kind of workpieces. The abutment shaft can be positioned higher by the thickness of the auxiliary abutment receiving unit. Hence, the axially moving amount of the abutment shaft can be reduced by the corresponding thickness of the auxiliary abutment receiving section. This can enhance the efficiency of forming grooves in workpieces whose thickness are different from each other.

Further, even when the circular saw blade performs upper cutting, neither fluffs nor cracks will be formed at the upper surface of the workpiece as long as the groove having a desired depth is provisionally formed in the upper surface of the workpiece. Thus, no fluffs nor cracks will be formed at the upper surface of the workpiece even during upper-cutting the workpiece after forming the groove at the upper surface. Therefore, the workpiece need not be turned upside down as in the case of cutting the workpiece with the conventional miter saw. Since the workpiece need not be turned upside down, the actual cut line can be easily aligned with the marking line.

Preferably, at least one of the abutment unit and the abutment receiving unit is movable with respect to associated one of the circular-saw unit and the support unit. The abutment unit is offset from the abutment receiving unit as a result of movement of at least one of the abutment unit and the abutment receiving unit when the circular-saw unit pivotally moves toward the base. With this structure, a mode of forming a groove of the predetermined depth and a mode of cutting the workpiece can be promptly switched from one to the other.

Preferably, the abutment unit includes an abutment section, and a holding member supported to the circular-saw unit for holding the abutment section. The holding member is pivotally movable between a first pivot and a second pivot position. The first pivot position permits the abutment section to contact with one of the abutment receiving unit and the auxiliary abutment receiving unit. The second pivot position permits the abutment section to out of contact from the abutment receiving unit and the auxiliary abutment receiving unit. With this structure, a mode of forming a groove of the predetermined depth and a mode of cutting the workpiece can be promptly switched from one to the other.

Preferably, the auxiliary abutment receiving unit includes a pivot member having a support shaft extending in substantially parallel with the pivot shaft and pivotally movable about the support shaft between a first position and a second position. In the first position the pivot member is mounted on the abutment receiving unit for allowing the abutment unit to directly contact with the pivot member. In the second position the pivot member is positioned away from the abutment receiving unit to avoid contact of the abutment unit with the pivot member. With this structure, if the pivot member is pivotally moved to the first position, a groove can be formed in the second kind workpiece. If the pivot member is pivotally moved to the second position, a groove can be formed in the first kind workpiece that is thinner than the second kind workpiece.

Preferably, the auxiliary abutment receiving unit includes a movable member slidably movable along the abutment receiving unit between a first position and a second position. In the first position the movable member is interposable between the abutment unit and the abutment receiving unit. In the second position the movable member is out of contact from the abutment unit. With this arrangement, if the movable member is moved to its first position, a groove can be formed in the second kink workpiece. If the movable member is moved to its second position, a groove can be formed in the first kind workpiece that is thinner than the second kind workpiece.

Preferably, the auxiliary abutment receiving unit includes a first section and a second section. The first section is slidably movable along the abutment receiving unit between a first position and a second position. In the first position the first section is interposable between the abutment unit and the abutment receiving unit. In the second position the first section is out of contact from the abutment unit. The second section is movable among a first location, second location, and a third location. In the first location, the second section is interposable between the abutment unit and the abutment receiving unit allowing the abutment unit to abut on the second section. The second location avoids contact of the abutment unit with the second section. In the third location the second section is interposable between the abutment unit and the abutment receiving unit and is superposed with the first section. The first section has a thickness smaller than that of the second section. With this arrangement, if the second section is interposed between the abutment unit and the abutment receiving unit without interposing the first section between the abutment unit and the abutment receiving unit, a shallow groove can be formed in the obverse surface of a thick workpiece. Further, if the first and second sections are not interposed between the abutment unit and the abutment receiving unit, a shallow groove can be formed in the obverse surface of a thin workpiece.

Preferably, the auxiliary abutment receiving unit includes a pivot member having a support shaft extending in substantially parallel with the pivot shaft and pivotally movable about the support shaft between a first position and a second position. In the first position the pivot member is mounted on the abutment receiving unit for allowing the abutment unit to directly contact with the pivot member. In the second position the pivot member is positioned away from the abutment receiving unit to avoid contact of the abutment unit with the pivot member. The auxiliary abutment receiving unit also includes a movable member slidably movable along the abutment receiving unit between a first place and a second place. In the first place the movable member is interposable between the abutment unit and the abutment receiving unit. In the second place the movable member is out of contact from the abutment unit. The pivot member is selectively interposable between the abutment unit and the movable member. With this structure, if the pivot member is interposed between the abutment unit and the abutment receiving unit without interposing the movable member between the abutment unit and the abutment receiving unit, a shallow groove can be formed in the obverse surface of a thick workpiece. If the movable member and the pivot member are not interposed between the abutment unit and the abutment receiving unit, a shallow groove can be formed in the obverse surface of a thin workpiece. Preferably, the movable member has a thickness capable of providing a difference in a distance ranging from 1 mm to 2 mm between a first distance and a second distance. The first distance is measured between a lowest part of the circular saw blade and the base when the abutment unit abuts on the movable member while the movable member is at the first place as a result of pivotal movement of the circular-saw unit toward the base. The second distance is measured between the lowest part of the circular saw blade and the base when the abutment unit abuts the abutment receiving unit while the movable member is at the second place as a result of pivotal movement of the circular-saw unit toward the base. Thus, a shallow groove having a depth of 1 mm to 2 mm can be formed in the obverse surface of the workpiece.

DETAILED DESCRIPTION OF THE PREFERRED EMBODIMENTS

Figure 1:
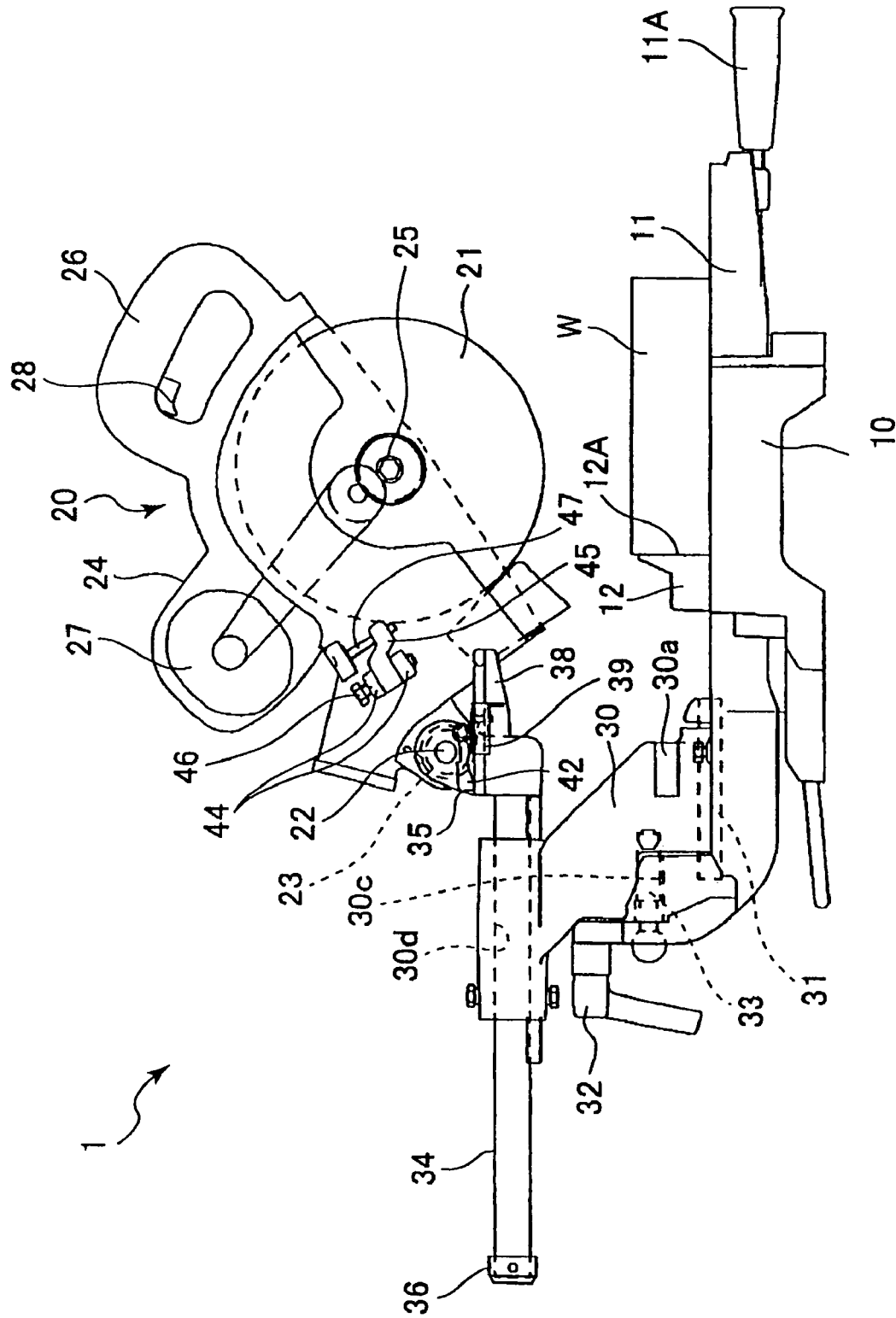
FIG. 1 is a side view showing a slide type miter saw according to a first embodiment of this invention.

A slide type miter saw according to a first embodiment of the invention will be described with reference to FIG. 1 to FIG. 19. As shown in FIG. 1, the slide type miter saw 1 includes a base 10, a turntable 11, a circular-saw unit 20, and a holder 30. The turntable 11 is supported on the base 10 and is rotatable about its axis with respect to the base 10. The turntable 11 cooperates with the base 10 to support a workpiece W such as a wood block. The circular-saw unit 20 holds a circular saw blade 21. The holder 30 stands upright from the rear portion of the turntable 11 and holds the circular-saw unit 20, allowing the unit 20 to move above the turntable 11. The holder 30 connects the turntable 11 to the circular-saw unit 20.

The turntable 11 is fitted, at its center part, in the base 10 and is pivotally movable in a horizontal plane. The upper surface of the turntable 11 is substantially flush with the upper surface of the base 10 for placing a workpiece W such as a wood block on the upper surfaces of the base 10 and turntable 11. A pair of fences 12 are secured to the upper surface of the base 10 and extend across the turntable 11 or along the diameter thereof. The fence 12 has an abutment surface 12A on which the workpiece W is abutted for positioning the workpiece W. Note that the fences 12 are arrayed in a row that extends from the left to the right across the base 10. The pair of fences 12 are spaced apart from each other at their inner ends, thus avoiding interference with the circular saw blade 21.

The turntable 11 has a knob section 11A extending therefrom frontwardly of the base 10. The user of the slide type miter saw 1 grips the knob section 11A and move the knob section 11A sideways, thereby rotating the turntable 11 about its axis. On the upper surface of the turntable 11, a pair of blade guides (not shown) spaced away from each other are secured. The blade guides define a groove (not shown) which extends in the direction of diameter of the turntable 11 for allowing the circumferential blade edge part of the circular saw blade 21 to be entered. The blade 21 enters the groove when the lowermost part of the circular saw blade 21 moves below the upper surface of the turntable 11 to cut the workpiece W. Hence, the blade 21 makes no fluffs on the lower surface of the workpiece W.

The holder 30 is pivotally movably supported by a holder shaft 31 to the turntable 11. An axis of the holder shaft 31 is substantially coincident with the upper surface of the turntable 11. Thus, the holder 30 is pivotally movable leftward and rightward.

Figure 2:
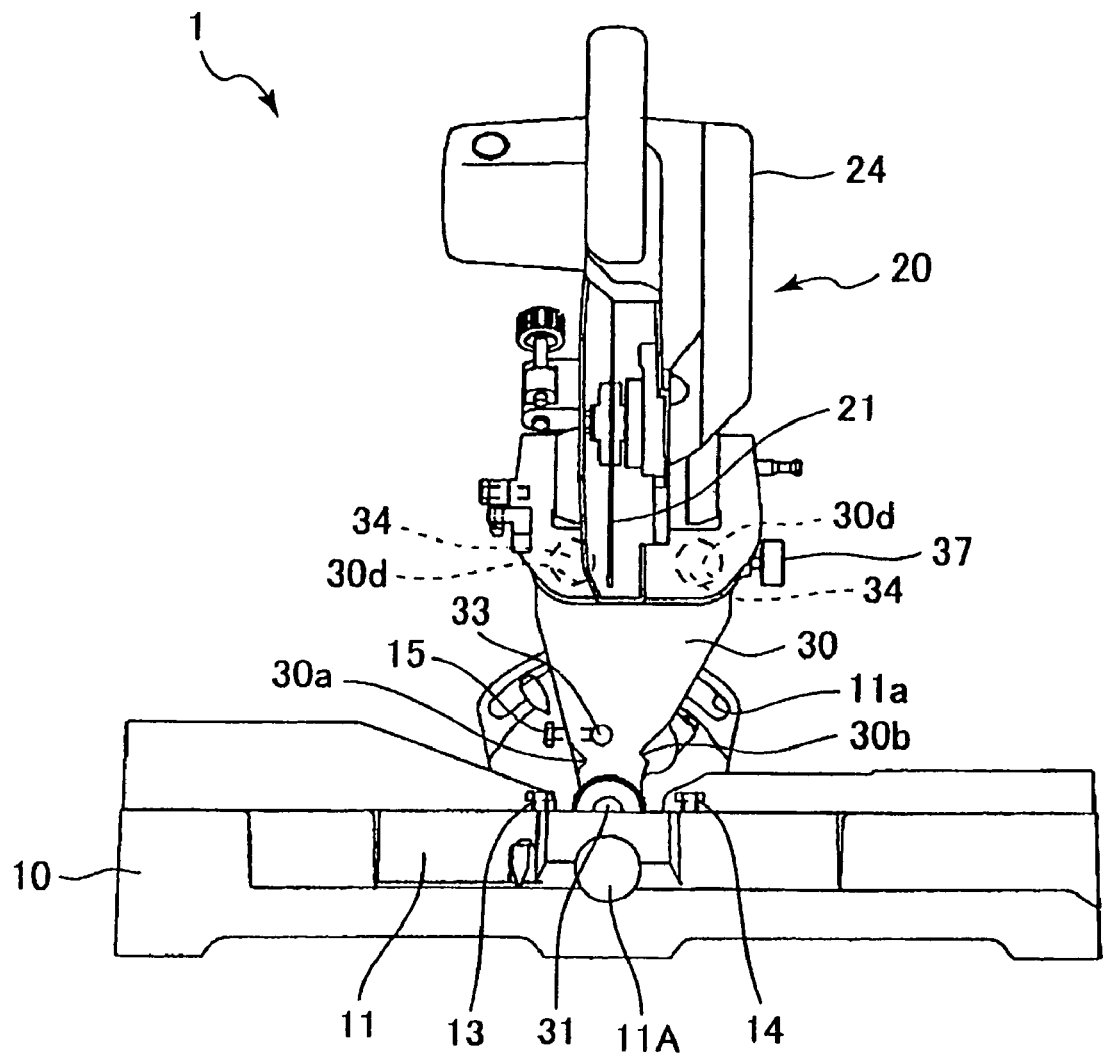
FIG. 2 is a front view showing the slide type miter saw according to the first embodiment.

A bracket 11A extends vertically from a rear part of the turntable 11; The bracket 11A is formed with an arcuate slot 11a (FIG. 2). An imaginary center of radius of the arcuate slot 11a is coincident with the holder shaft 31. The holder 30 is formed with a hole (not shown) at a position in alignment with the arcuate slot 11a. A clamp lever 32 (FIG. 1) passes through the arcuate slot 11a. The clamp lever 32 has a screw part, which is threadingly engaged with the hole (not shown) of the holder 30. If the clamp lever 32 is unfastened, the holder 30 becomes pivotally movable about the axis of the holder shaft 31 as long as the clamp lever 32 moves relative to the arcuate slot 11a. When the clamp lever 32 is fastened, the clamp lever 32 and the holder 30 fixdely interpose therebetween the bracket 11A. Thus, the holder 30 can be held at a desired inclined posture. The arcuate slot 11a has such a length that the holder 30 can be moved between the upright position (hereinafter referred to as "right-angle cutting position") where the holder 30 stands at right angles to the base 10 and the inclined position where the holder 30 inclines at 45° to the left and to the right in FIG. 2.

At the front part of the holder 30, stoppers 30a and 30b in the form of recesses are provided. The stoppers 30a and 30b are located near the part of the holder 30 that is in contact with the base 10. The stoppers extend from the front side of the holder 30 to the rear side thereof. Vertically extending screw holes are formed at the upper surface of the rear part of the turntable 11. Stopper bolts 13 and 14 are threadingly engaged with the screw holes. Heads of the stopper bolts 13, 14 are located above the upper surface of the turntable 11. Vertical position of the heads of the stopper bolts 13, 14 can be controllable so as to define the rightmost and leftmost inclined positions of the holder 30. That is, when the holder 30 is pivotally moved leftward or the rightward, one of the stoppers 30a and 30b is brought into abutment with associated one of the heads of the stopper bolts 13, 14. Thus, the holder 30 is held inclined at the leftmost position or the rightmost position. The stopper bolts 13 and 14 have their lowermost vertical positions, such that the stopper bolt 13 abuts on the stopper 30a when the holder 30 is pivotally moved to the left and inclined at 45°, and the stopper bolt 14 abuts on the stopper 30b when the holder 30 is pivotally moved to the right and inclined at 45°.

A through hole 30c (FIG. 1) extends frontward/rearward direction at a vertically intermediate position of the holder 30. A pin 33 (FIG. 1) extends through the through hole 30c. The pin 33 is slidably movable with respect to the through hole 30c. The rear portion of the turntable 11 has a through hole (not shown) aligned with the through hole 30c of the holder 30 and extending perpendicular thereto. A stopper bolt 15 (FIG. 12) is inserted in the through hole of the turntable 11. The stopper bolt 15 protrudes from ends of the through hole of the turntable 11. Thus, the stopper bolt 15 is abuttable on an outer peripheral surface of the pin 33 when the holder 30 takes the right-angle cutting position. In this connection, the pin 33 serves as a positioning member for providing the right-angle cutting position. By this abutment, the user can recognize that the holder 30 lies at the right-angle cutting position. By displacing the pin 33 in its axial direction, abutment of the pin 33 on the stopper bolt 15 can be avoided.

The upper part of the holder 30 has two through holes 30d (FIG. 2), which extend parallel to the upper surface of the turntable 11 and in the frontward/rearward direction thereof. Slide support members (not shown) are provided in these holes 30d, respectively. Further, two guide bars 34 extend through the holes 30d, respectively. The guide bars 34 are slidable frontward/rearward with respect to the holder 30 and in parallel to the upper surface of the turntable 11 by the slide support members (not shown). A circular-saw holder 35 (FIG. 1) is secured to the front ends of the guide bars 34. Further, a cap 36 is fastened to the rear ends of the guide bars 34 for preventing the guide bars 34 from slipping out of the holder 30. A knob 37 (FIG. 2) is mounted on one lateral side of the holder 30. The user can turn the knob 37 so that the guide bars 34 become temporarily immovable.

As shown in FIG. 1, the circular-saw unit 20 is coupled to the top of the circular-saw holder 35. More specifically, the circular-saw unit 20 is pivotally connected to the upper end portion of the circular-saw holder 35 by a shaft 22 that extends in a lateral direction of the base 10, or perpendicular to the frontward/rearward direction of thereof. Thus, the circular-saw unit 20 is pivotally movable up and down about the shaft 22. A spring 23 is interposed between the circular-saw holder 35 and the circular-saw unit 20 for normally biasing the circular-saw unit 20 upwards.

The circular-saw unit 20 has a main frame 24. The main frame 24 rotatably supports a saw shaft 25 to which the circular saw blade 21 is detachably secured. A handle 26 and an electric motor 27 are mounted on the top of the main frame 24. The motor 27 is coupled to the saw shaft 25 to drive the circular saw blade 21. A switch 28 is provided in the handle 26. The user operates the switch 28 with a finger for driving the motor 27.

A stopper receiver 38 (FIG. 1) is secured to distal front end of the guide bars 34. The stopper receiver 38 is positioned frontward with respect to the pivotally connecting region of the circular-saw holder 35. The stopper receiver 38 extends from the front ends of the guide bars 34 in the axial directions of the guide bars 34, and has a flat and horizontal upper surface. The stopper receiver 38 defines a first abutment receiving section and a second abutment receiving section. A first stopper bolt 46 which will be described later is abuttable on the first abutment receiving section, and a second stopper bolt 47 which will be described later is abuttable on the second abutment receiving section. Therefore, the first and second abutment receiving sections constituted by the upper surface of the stopper receiver 38 lie in the same horizontal plane.

Figure 3:
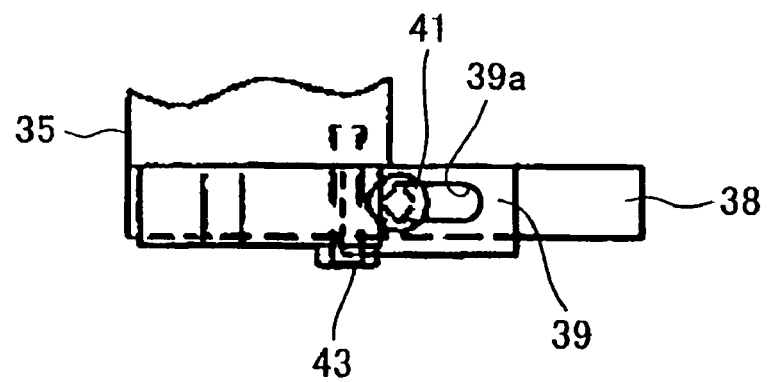
FIG. 3 is a plan view showing an essential portion of the slide type miter saw according to the first embodiment and particularly showing a plate.

A plate 39 (FIG. 1, FIG. 3) is provided on the stopper receiver 38. The plate 39 is formed by bending a rectangular plate about 1 mm to 2 mm thick into an L-shaped cross-section in which one longitudinal side of the rectangular plate is bent along one longitudinal side of the stopper receiver 38. The plate 39 is mounted on the stopper receiver 38 and covers the longitudinal side thereof. As shown in FIG. 3, the plate 39 is formed with an elongated slot 39a extending in the extending direction of the stopper receiver 38. The stopper receiver 38 is formed with a female thread hole (not shown) at a position in alignment with the elongated slot 39a. A male screw 41 passes through the elongated slot 39a and is threadingly engaged with the female thread hole (not shown) of the stopper receiver 38. This prevents the plate 39 from leaving the stopper receiver 38. In addition, the plate 39 is movable on the stopper receiver 38 in extending direction of the stopper receiver 38 within a length of the elongated slot 39a.

Figure 4:
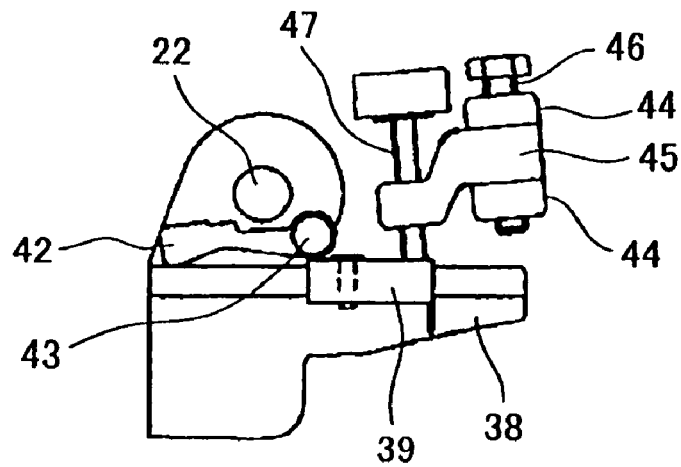
FIG. 4 is a side view showing the essential portion of the slide type miter saw according to the first embodiment and illustrating the plate set at its first position and a pivot member set at its second pivot position.
Figure 6:
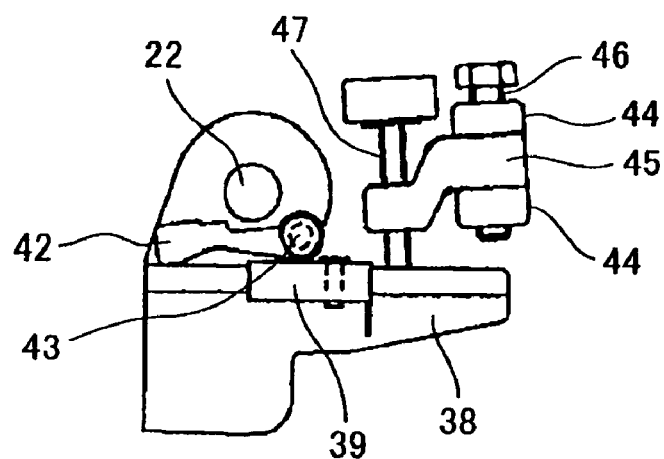
FIG. 6 is a side view showing the essential portion of the slide type miter saw according to the first embodiment and illustrating the plate set at its second position and the pivot member set at its second pivot position.
Figure 8:
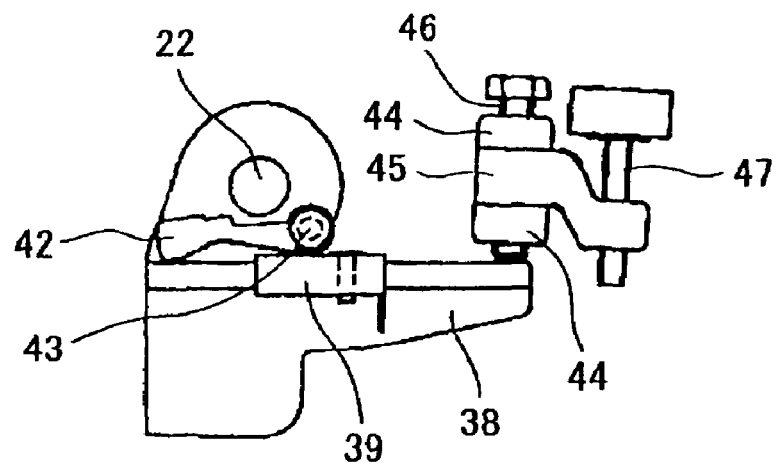
FIG. 8 is a side view showing the essential portion of the slide type miter saw according to the first embodiment and showing a first stopper bolt abutting on a stopper receiver.

More specifically, the plate 39 is movable between a first position that is rightmost in FIG. 3 where a left end of the elongated slot 39a is abutted on the male screw 41 and a second position that is leftmost in FIG. 3 where a right end of the elongated slot 39a abutted on the male screw 41. In the first position, the position of the plate 39 partly overlaps the second abutment section of the stopper receiver 38 to which the second stopper bolt 47 is to be abutted as shown in FIG. 4. In the second position, an entire part of the plate 39 does not overlap second abutment section of the stopper receiver 38 as shown in FIGS. 6 and 8. The plate 39 functions as a third abutment receiving section, or a horizontally movable member, or an auxiliary abutment receiving section, or a first auxiliary abutment receiving section those being referred in claims.

Figure 10:
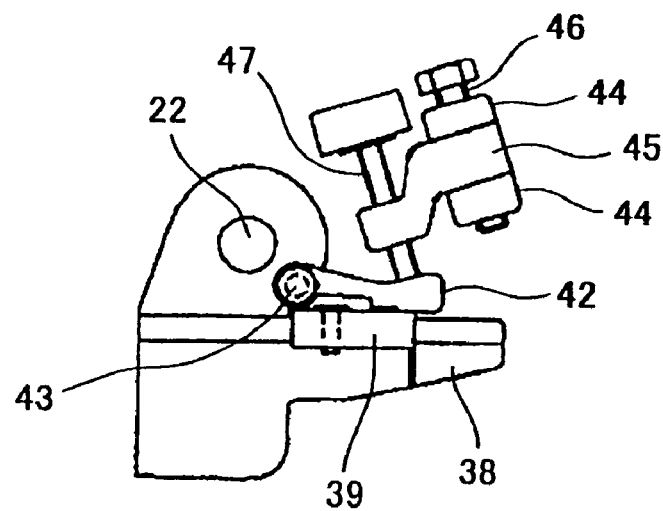
FIG. 10 is a side view showing the essential portion of the slide type miter saw according to the first embodiment, and illustrating the plate held at its first position and the pivot member held at its third pivot position.
Figure 12:
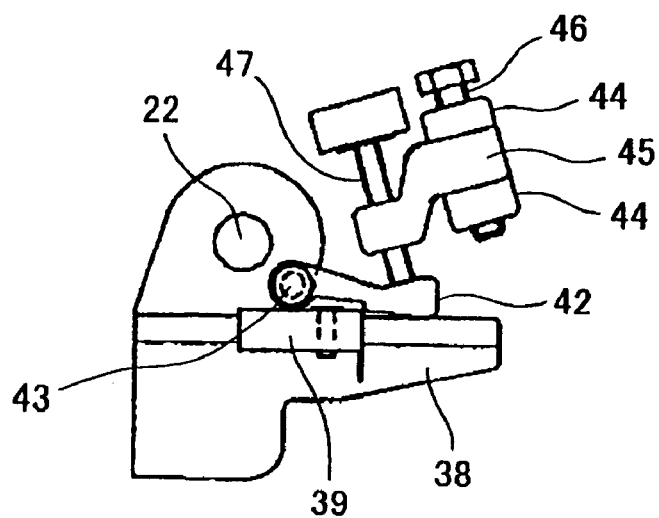
FIG. 12 is a side view showing the essential portion of the slide type miter saw according to the first embodiment, and depicting the plate at its second position and the pivot member at a first pivot position.

A pivot member 42 is provided on the circular-saw holder 35 and located near the shaft 22 (FIG. 1). The pivot member 42 is supported by a shaft 43 (FIG. 4) extending from the circular-saw holder 35 and pivotally movable about an axis of the shaft 43. The shaft 43 extends parallel to the shaft 22. Hence, the pivot member 42 is pivotally movable to first to three pivot positions. In the first pivot position, the pivot member 42 lies at a position between the second stopper bolt 47 and the stopper receiver 38, and the second stopper bolt 47 is abuttable on the pivot member 42 as shown in FIG. 12. In the second pivot position, the pivot member 42 does not lie at a position between the second stopper bolt 47 and the stopper receiver 38 so that the second stopper bolt 47 is not abuttable on the pivot member 42 as shown in FIG. 4. In the third pivot position, the pivot member 42 has its free end mounted on the plate 39 while the plate 39 remains in the first position as shown in FIG. 10 and the pivot member 42 abuts on both the plate 39 and the second stopper bolt 47. The free end of the pivot member 42 shown in FIG. 4 has a thickness of about 3 cm as measured in the vertical direction. The pivot member 42 functions as a third abutment section, or an auxiliary abutment section, or a second auxiliary abutment section.

Two stopper-bolt retainers 44 are provided on one side of the mainframe 24 which one side is in confrontation with the stopper receiver 38 when the circular-saw unit 20 is pivotally moved about the shaft 22. The stopper-bolt retainers 44 include two projections that protrude from the main frame 24 in parallel with the axial direction of the shaft 22. The two projections are spaced away from each other by a predetermined distance. A stopper holder 45 has one end portion interposed between the two stopper retainers 44.

The two stopper-bolt retainers 44 and one end portion of the stopper holder 45 are formed with through holes (not shown). The through holes of the retainers 44 and the stopper holder 45 are linearly aligned and have the same diameter. Female screws are formed in the inner peripheral surfaces of the through holes of the two stopper-bolt receives 44. The first stopper bolt 46 passes through the through holes of the two stopper-bolt retainers 44 and stopper holder 45 and is threadingly engaged with the female threads of the through holes of the two stopper-bolt retainers 44. The first stopper bolt 46 extends in a direction perpendicular to the shaft 22, that is, the first stopper bolt 46 extends along a tangential line of an imaginary circle whose center is at an axis of the shaft 22.

The first stopper bolt 46 penetrates the one end portion of the stopper holder 45. The stopper holder 45 is therefore pivotally movable about the axis of the first stopper bolt 46.

The stopper holder 45 extends in a direction away from the first stopper bolt 46 and has a free end formed with a through hole (not shown). The through hole extends parallel to the axis of the first stopper bolt 46. A female screw is formed in the through hole. The second stopper bolt 47 is threadingly engaged with the female thread of the through hole. Like the first stopper bolt 46, the second stopper bolt 47 extends at right angles to the axis of the shaft 22. That is, the bolt 47 extends along a tangential line of an imaginary circle whose center is at the axis of the shaft 22. The second stopper bolt 47 movable between its first pivot position and its second pivot position. The first pivot position is provided by pivotally moving the second stopper bolt so that the second stopper bolt 47 is positioned closer to the shaft 22 than the first stopper bolt 46 to the shaft 22. The second pivot position is provided by pivotally moving the second stopper bolt 47 in an opposite direction so that the first stopper bolt 46 is positioned closer to the shaft 22 than the second stopper bolt 47 to the shaft 22.

The first stopper bolt 46 and the second stopper bolt 47 are movable in their axial directions upon rotation because of the threading engagement of the corresponding female screws. Therefore, projecting length of the first stopper bolt 46 from the lower surface of the lower retainer 44, and the projecting length of the second stopper bolt 47 from the lower surface of the free end of the stopper holder 45 can be finely controlled.

When the stopper holder 45 is pivoted so as to provide the second pivot position of the second stopper bolt 47 as shown in FIG. 8, the first stopper bolt 46 is brought into abutment with the stopper receiver 38 if the circular-saw unit 20 is pivotally moved downwardly around the shaft 22. On the other hand, when the stopper holder 45 is pivoted so as to provide the first pivot position of the first stopper bolt 47 as shown in FIG. 4, the second stopper bolt 47 is brought into abutment with one of the stopper receiver 38 (FIG. 16), the plate 39 (FIG. 4) and the pivot member 42 (FIG. 10) if the circular-saw unit 20 is pivotally moved downwardly around the shaft 22.

Hence, the lowermost pivot position of the circular saw unit 20 can be determined or regulated when the circular-saw unit 20 is pivotally moved downwards or toward the base 10 around the shaft 22 by properly controlling the projecting length of the first stopper bolt 46 to an appropriate length. Further, the circular saw blade 21 can be driven to form a groove of a desired depth in the upper surface of the workpiece W, if the projecting length of the second stopper bolt 47 is adjusted to an appropriate value. In the latter case, the distal end of the second stopper bolt 47 keeps abutting on the stopper receiver 38. The first stopper bolt 46 functions as a first abutment section or an abutment section, the second stopper bolt 47 functions as a second abutment section or an abutment section, and the stopper holder 45 functions as an abutment section holding member, those being referred in claims.

Figure 5:
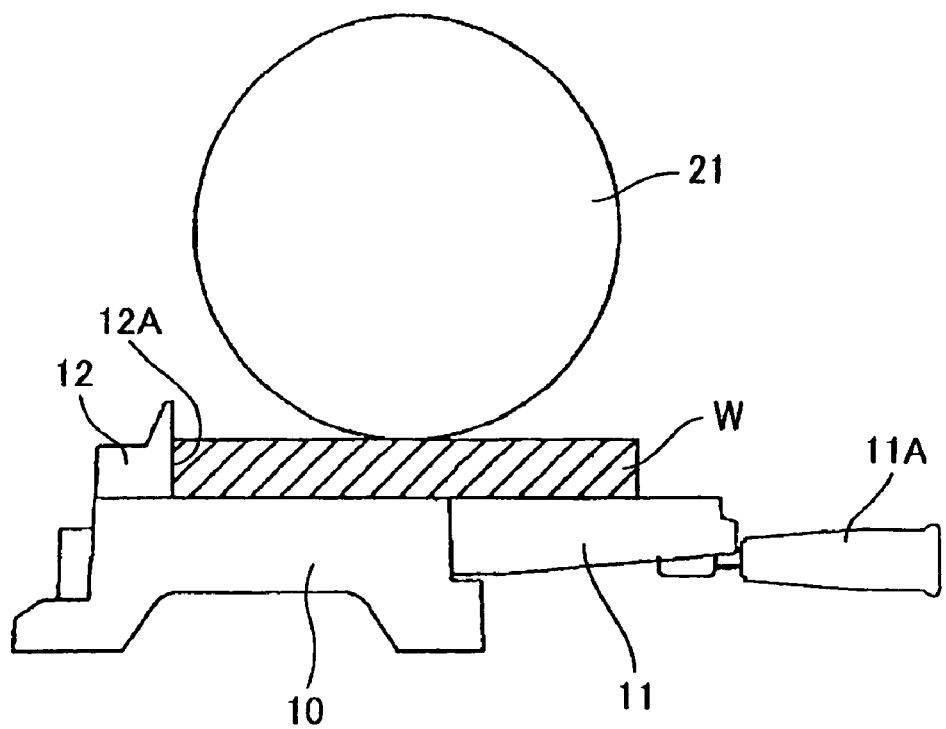
FIG. 5 is a view showing a position of a lowest part of a circular saw blade aligned with an obverse surface of a thin workpiece in the slide type miter saw according to the first embodiment.

For cutting a relatively thin workpiece W by the slide type miter saw 1, the workpiece W is mounted on the turntable 11. Then, the workpiece W is pushed onto the abutment surfaces 12A of the fences 12. Thereafter, the clamp lever 32 is tightened, thereby setting the holder 30 in an inclined position. Next, as shown in FIG. 4, the plate 39 of the stopper receiver 38 is moved forward to the first position, and the stopper holder 45 is pivotally moved to provide the first pivot position of the second stopper bolt 47. Then, as shown in FIG. 5, the second stopper bolt 47 is rotated about its axis so as to axially move the second stopper bolt 47 in order to set the circumferential surface of the blade edge of the circular saw blade 21 at the same level as the upper surface of the workpiece W. The second stopper bolt 47 thus abuts on the plate 39 as is illustrated in FIG. 4.

Next, the plate 39 is moved backwards to its second position, as is illustrated in FIG. 6. Then, the switch 28 provided on the handle 26 is pushed, thus driving the motor 27. The motor 27 rotates the saw shaft 25, which in turn rotates the circular saw blade 21. The circular-saw unit 20 with the rotating saw 21 is lowered against the biasing force of the spring 23 until the second stopper bolt 47 abuts on the stopper receiver 38. This abutment inhibits the circular-saw unit 20 from further moving downwards. As a result, a shallow slit is cut in the obverse surface of the workpiece W. The slit will be an end of a shallow groove about 1 mm to 2 mm deep.

Figure 7:
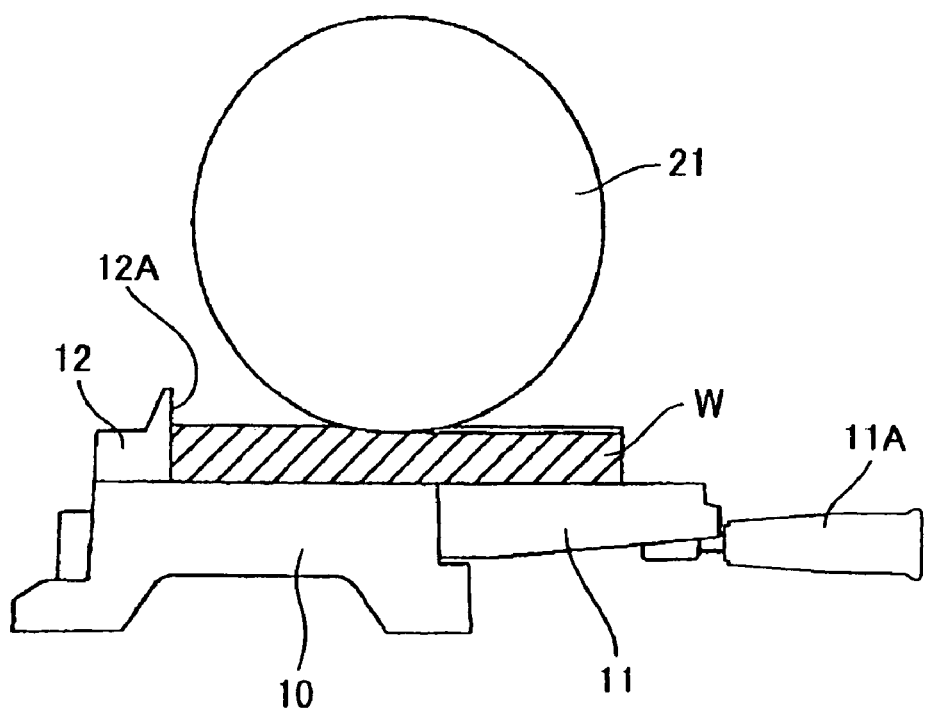
FIG. 7 is a view showing a state of forming a shallow groove in an obverse surface of a thin workpiece with the circular saw blade in the slide type miter saw according to the first embodiment.

Then, the handle 26 is pushed toward the holder 30 (to the left in FIG. 1). Alternatively, the handle 26 is pulled forwards. The circular-saw holder 35, support 36, guide bars 34 and circular-saw unit 20 move together, whereupon a shallow groove about 1 mm to 2 mm deep is formed in the obverse surface of the workpiece W as shown in FIG. 7. Thereafter, the force for pushing the handle 26 is reduced, so that the biasing force of the spring 23 pushes the circular-saw unit 20 upwards.

The shallow groove about 1 mm to 2 mm deep can be formed by the following reason. The lowest part of the circuit saw blade 21 is spaced apart by a first distance from the base 10 when the second stopper bolt 47 abuts on the plate 39 as the circular-saw unit 20 pivotally moves toward the base 10 while the plate 39 remains at its first position. When the second stopper bolt 47 abuts on the stopper receiver 38 as the unit 20 moves toward the base 10 while the plate 39 remains at the second position, the lowest part of the circuit saw blade 21 is spaced apart from the base 10 by a second distance. The difference between the first and second distances ranges from 1 mm to 2 mm. Therefore, the shallow groove can be formed.

Figure 9:
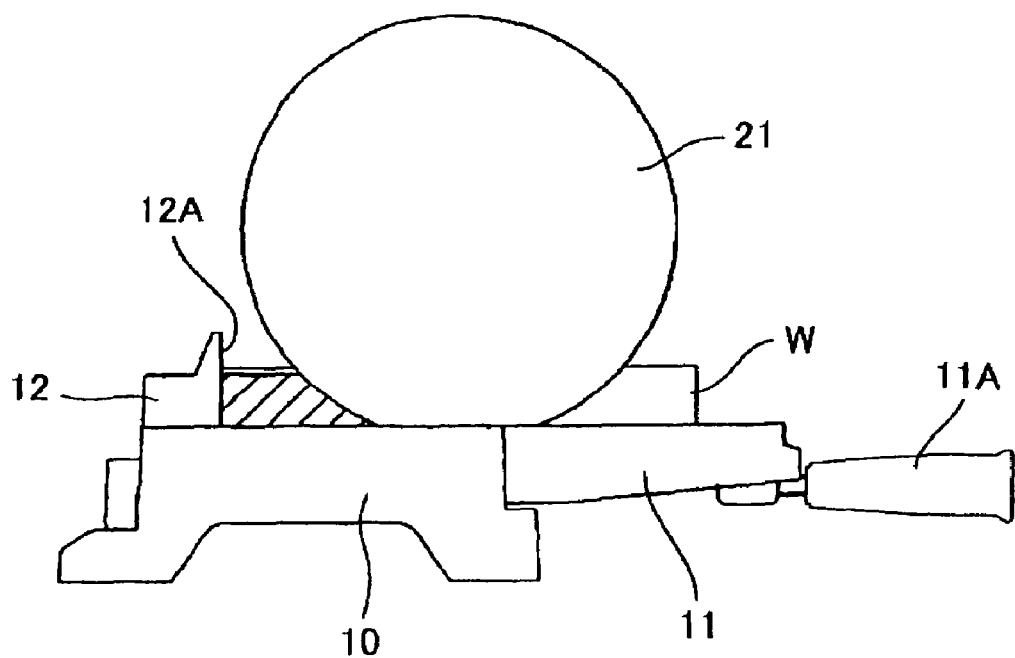
FIG. 9 is a view showing a mode of cutting the thin workpiece with the circular saw blade in the slide type miter saw according to the first embodiment.

Next, the stopper holder 45 is pivotally moved to provide the second pivot position of the second stopper bolt 47 as shown in FIG. 8 preventing the second stopper bolt 47 from abutting on the stopper receiver 38. Conversely, the first stopper bolt 46 abuts on the stopper receiver 38. This enables the circular-saw unit 20 to be pivotally moved to the lowermost pivot position. In this state, the handle 26 is pulled forwards (to the right in FIG. 1) in the same way as to form the groove. The circular saw blade 21 is thereby moved forward. The handle 26 is then pushed down, thereby cutting the workpiece W. Then, as shown in FIG. 9, the circular saw blade 21 is slidingly moved backwards. Thus, the workpiece W is completely cut. At this time, the circular-saw unit 20 is pulled up. Then, the biasing force of the spring 23 moves the circular-saw unit 20 back to the uppermost position.

Figure 11:
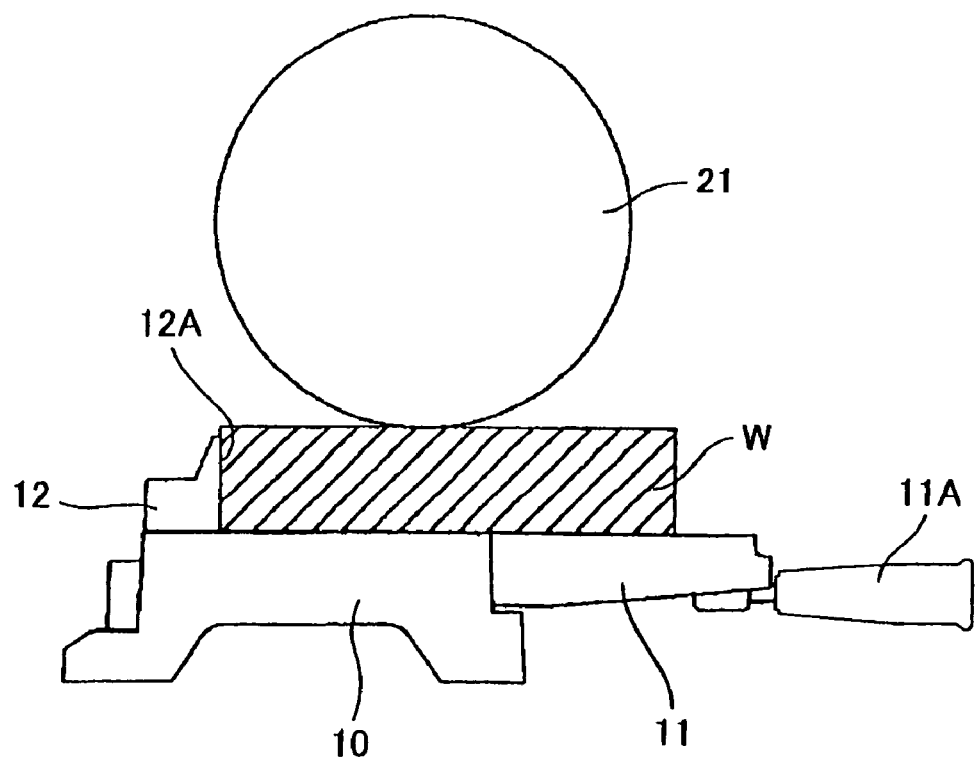
FIG. 11 is a view showing an alignment of the lowest part of the circular saw blade of the miter saw according to the first embodiment with an obverse surface of a thick workpiece.

In order to cut a relatively thick workpiece W, the workpiece W is placed on the turntable 11. Then, the workpiece W is pushed onto the abutment surfaces 12A of the fences 12. Thereafter, the clamp lever 32 is tightened, setting the holder 30 in an inclined position. Next, the plate 39 of the stopper receiver 38 is moved forward to the first position as is illustrated in FIG. 10, and the pivot member 42 is pivotally moved to the third pivot position and made to abut on the plate 39 on the stopper receiver 38. Further, the stopper holder 45 is pivotally moved to provide the first pivot position of the second stopper bolt 47. Then, the second stopper bolt 47 is rotated about its axis for axially moving the second stopper bolt 47, setting the circumference of the blade edge of the circular saw blade 21 at the same level as the upper surface of the workpiece W, as is illustrated in FIG. 11. The second stopper bolt 47 is therefore made to abut on the pivot member 42 as is depicted in FIG. 10.

Next, the plate 39 is moved backwards to its second position as shown in FIG. 12. Then, the switch 28 provided on the handle 26 is pushed, thus driving the motor 27. The motor 27 rotates the saw shaft 25, which in turn rotates the circular saw blade 21. The circular-saw unit 20 with the saw 21 is lowered against the biasing force of the spring 23 until the second stopper bolt 47 abuts on the pivot member 42. This inhibits the circular-saw unit 20 from further moving downwards. As a result, a shallow slit is formed in the obverse surface of the workpiece W. The slit will be an end of a shallow groove about 1 mm to 2 mm deep.

Figure 13:
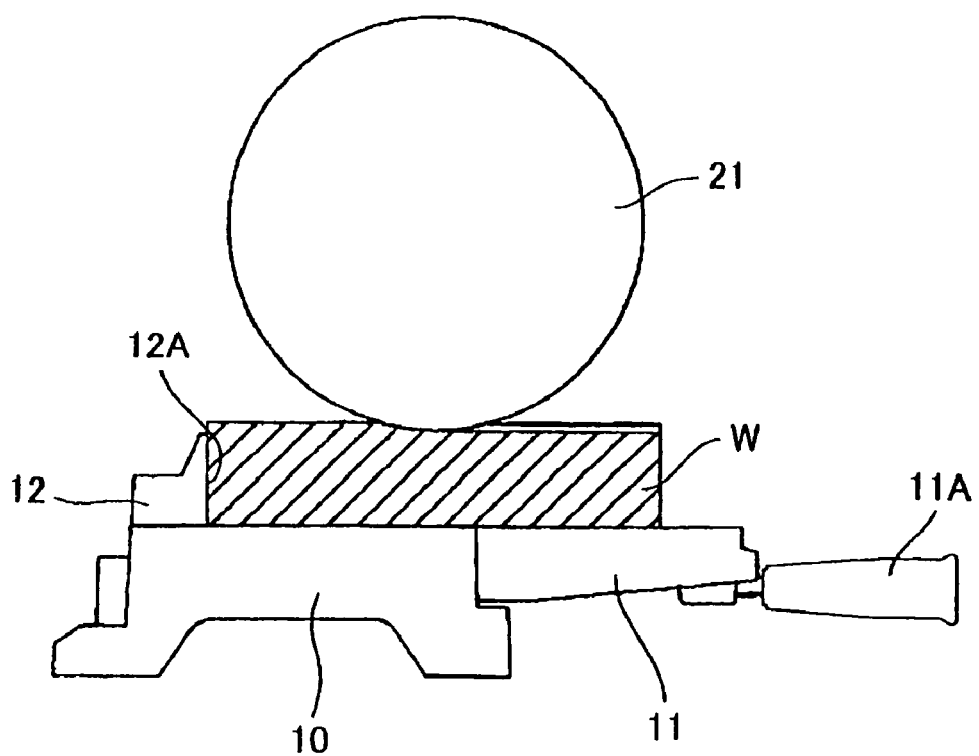
FIG. 13 is a view showing a state of forming a shallow groove in the obverse surface of the thick workpiece with the circular saw blade in the slide type miter saw according to the first embodiment.

Then, the handle 26 is pushed toward the holder 30 (to the left in FIG. 1). (Alternatively, the handle 26 is pulled forwards.) The circular-saw holder 35, support 36, guide bars 34 and circular-saw unit 20 move together. A shallow groove about 1 mm to 2 mm deep is thus formed in the obverse surface of the workpiece W as is illustrated in FIG. 13. Thereafter, the force pushing the handle 26 is reduced. Overcoming this force, the biasing force of the spring 23 pushes the circular-saw unit 20 upwards.

Figure 14:
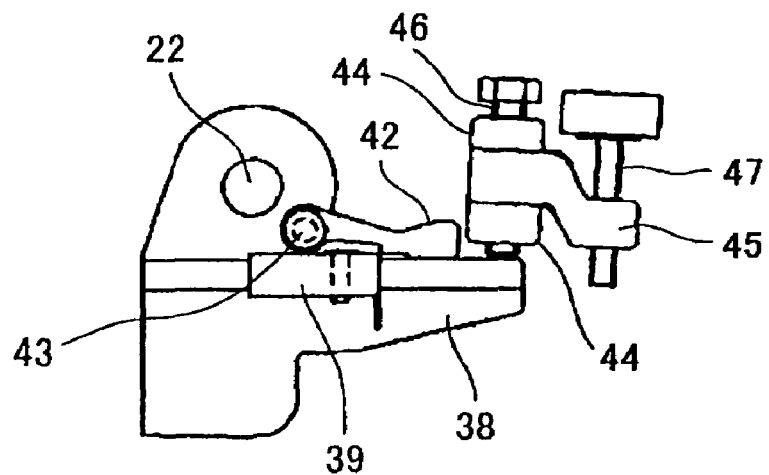
FIG. 14 is a side view showing the essential portion of the slide type miter saw according to the first embodiment, and showing the first stopper bolt abutting on the stopper receiver.
Figure 15:
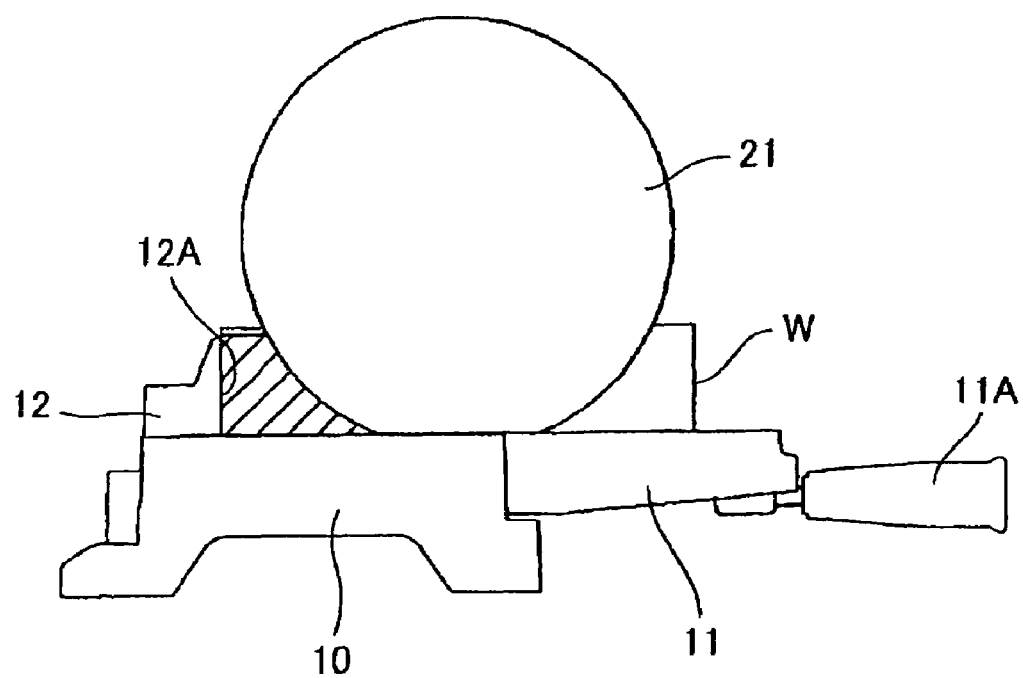
FIG. 15 is a view showing a mode of cutting the thick workpiece with the circular saw blade in the slide type miter saw according to the first embodiment.

Next, the stopper holder 45 is pivotally moved to provide the second pivot position of the second stopper bolt 47 as shown in FIG. 14, thus preventing the second stopper bolt 47 from abutting on the pivot member 42. Conversely, the first stopper bolt 46 is made to abut on the stopper receiver 38. The circular-saw unit 20 can therefore be pivotally moved until the unit 20 reaches the lowermost position. In this condition, the handle 26 is pulled forwards (to the right in FIG. 1) in the same way as to form the groove. As shown in FIG. 15, the circular-saw unit 20 is thereby moved forward. The handle 26 is then pushed down, thereby cutting the workpiece W. Then, the circular-saw unit 20 is slid backwards. Thus, the workpiece W is completely cut. At this time, the circular-saw unit 20 is pulled up. Then, the circular-saw unit 20 is moved back to the uppermost position by the biasing force of the spring 23.

Figure 16:
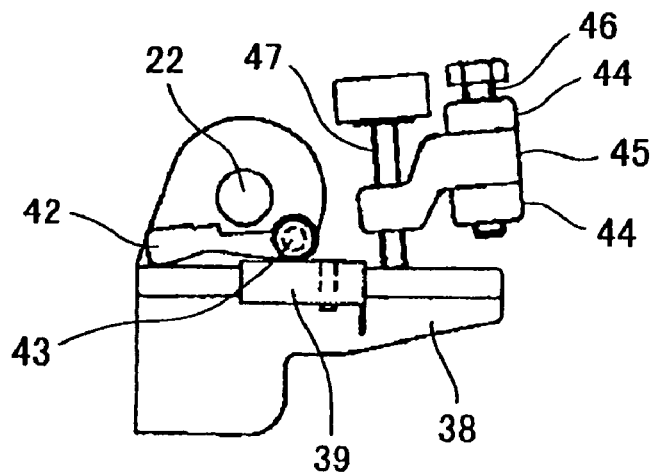
FIG. 16 is a side view showing the essential portion of the slide type miter saw according to the first embodiment, and depicting the plate held at its second position and the pivot member held at its second pivot position.
Figure 17:
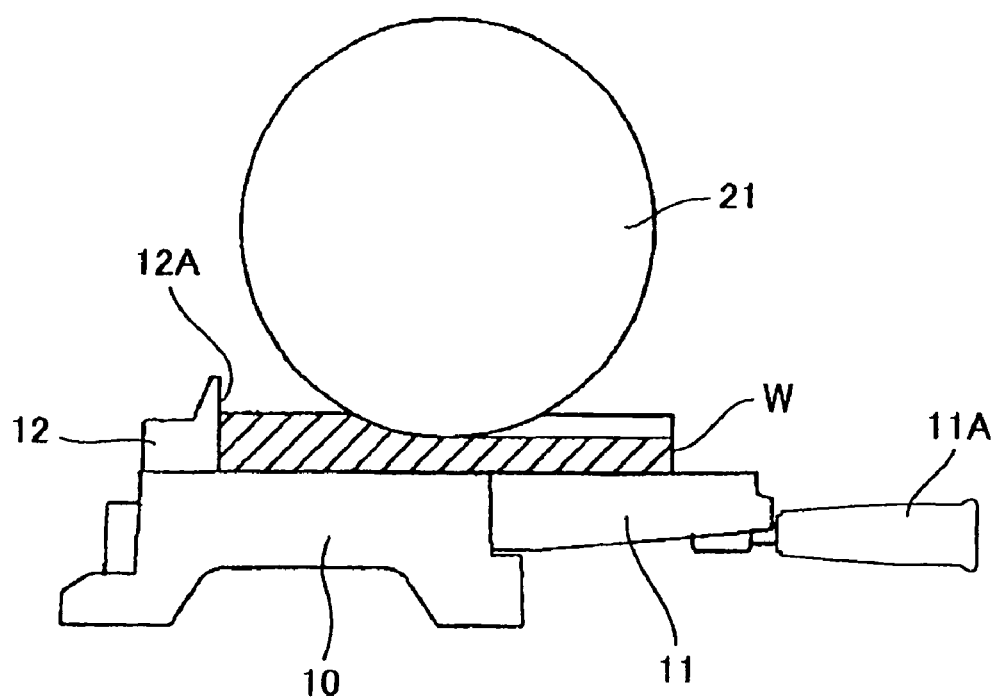
FIG. 17 is a view showing a state of forming a groove of a desired depth in the obverse surface of a thin workpiece with the circular saw blade in the slide type miter saw according to the first embodiment.

To form a groove of a desired depth in the obverse surface of a relatively thin workpiece W, the pivot member 42 is pivotally moved to the second pivot position where the pivot member 42 does not abut on the stopper receiver 38, and the plate 39 is moved backwards to its second position, as is illustrated in FIG. 16. Then, the stopper holder 45 is moved to approach the shaft 22, namely pivotally moved to the first pivot position of the second stopper bolt 47. With this state, the axial position of the second stopper bolt 47 relative to the stopper holder 45 is adjusted in a desired position capable of providing the desired depth of the groove as shown in FIG. 17. In this condition, the circular-saw unit 20 is pivotally moved downwards and rearward against the biasing force of the spring 23. Thus, a groove of the desired depth can be formed in the obverse surface of the workpiece W as shown in FIG. 17.

Figure 18:
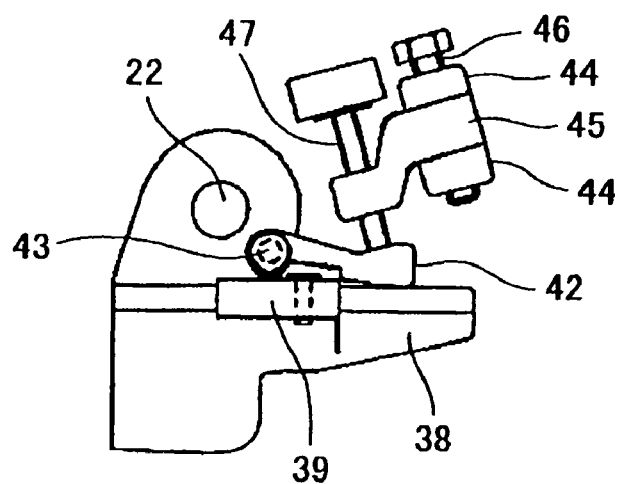
FIG. 18 is a side view showing the essential portion of the slide type miter saw according to the first embodiment, and illustrating the plate held at its second position and the pivot member held at the first pivot position.
Figure 19:
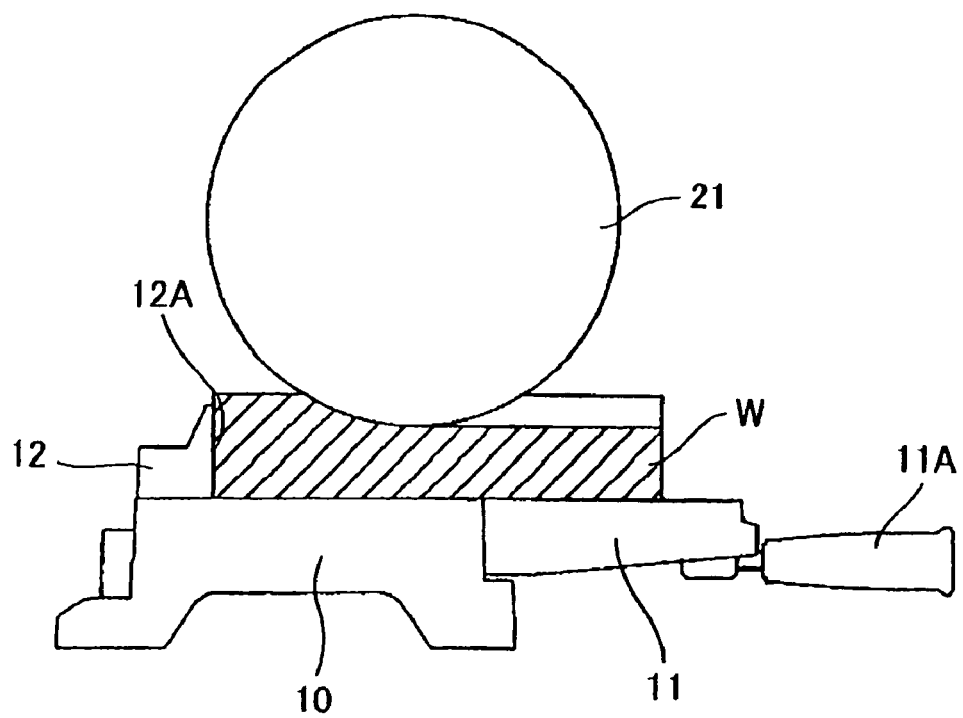
FIG. 19 is a view showing a state of forming a groove of a desired depth in the obverse surface of a thick workpiece with the circular saw blade in the slide type miter saw according to the first embodiment.

To form a groove of a desired depth in the obverse surface of a relatively thick workpiece W, the pivot member 42 is pivotally moved to the first pivot position where the pivot member 42 abuts on the stopper receiver 38, and the plate 39 is moved backwards to its second position as illustrated in FIG. 18. Then, the stopper holder 45 is moved to approach the shaft 22, namely pivotally moved to provide the first pivot position of the second stopper bolt 47. Next, the axial position of the second stopper bolt 47 relative to the stopper holder 45 is adjusted in a desired position capable of providing a desired depth of the groove as shown in FIG. 19. In this state, the circular-saw unit 20 is pivotally moved downwards and rearward against the biasing force of the spring 23. Thus, a groove of the desired depth can be formed in the obverse surface of the workpiece W as depicted in FIG. 19.

Because the stopper holder 45 is pivotally moved, and the second stopper bolt 47 is provided in addition to the first stopper bolt 46, groove depth position and the lowermost position of the circular-saw unit 20 can be switched quite easily. Further, since the plate 39 is movably provided, a shallow groove can be provisionally formed in the obverse surface of the workpiece W. Consequently, fluffs or cracks will not be formed on the obverse surface of the workpiece W.

Further, because the pivot member 42 is provided, a mode of forming a groove in a thick workpiece W can be easily changed to a mode of forming a groove in a thin workpiece W, and vice versa by changing pivot position of the pivot member 42.

In the present embodiment, the circular saw blade 21 has a diameter of 190 mm and the maximum right-angle cutting height is 50 mm. The lowest part of the circular saw blade 21 is spaced from the upper surface of the turntable 11 by a distance of 0 to 20 mm, if the second stopper bolt 47 abuts on the stopper receiver 38 as shown in FIG. 16 for preventing the circular-saw unit 20 from moving downwards. On the other hand, the lowest part of the circular saw blade 21 is spaced from the upper surface of the turntable 11 by a distance of 50 mm, if the second stopper bolt 47 abuts on the pivot member 42 for preventing the circular-saw unit 20 from moving downwards as shown in FIG. 18. The latter distance can be changed in a range of from 20 mm to 50 mm if the pivot member has a thickness of 3 cm or less is selectively used.

A slide type miter saw according to a second embodiment of the present invention will be described with reference to FIGS. 20 and 21. The second embodiment differs from the first embodiment only in that a horizontal pivot member 52 and a horizontal pivot plate 59 are used instead of the plate 39 and the pivot member 42 of the first embodiment.

Figure 20:
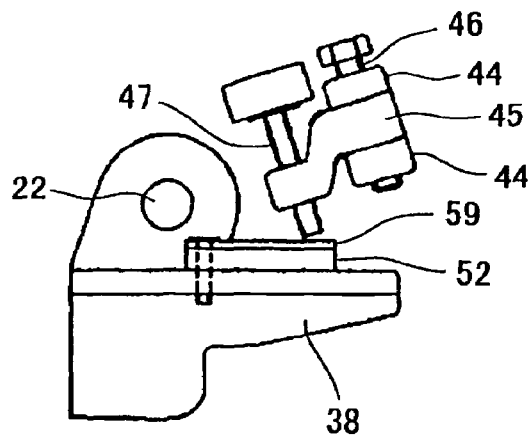
FIG. 20 is a side view showing an essential portion of a slide type miter saw according to a second embodiment of the present invention, and showing a horizontal pivot plate and a horizontal pivot member superimposed with a stopper receiver.
Figure 21:
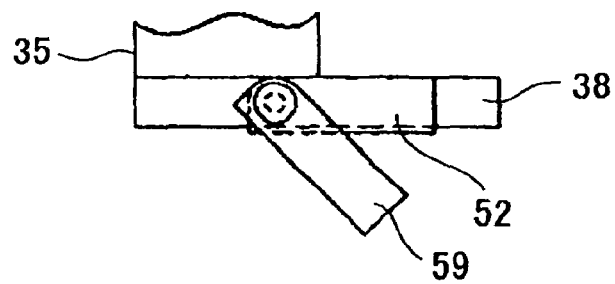
FIG. 21 is a plan view showing the essential portion of the slide type miter saw according to the second embodiment, and depicting the horizontal pivot member mounted on the stopper receiver, and the horizontal pivot plate offset from the horizontal pivot member.

The horizontal pivot member 52 and horizontal pivot plate 59 are rectangular plates having thickness different from each other as seen from FIGS. 20 and 21. The horizontal pivot member 52 is about 3 cm thick, while the horizontal pivot plate 59 is about 1 mm to 2 mm thick. The horizontal pivot member 52 is mounted on the stopper receiver 38 and the horizontal pivot plate 59 is laid on the horizontal pivot member 52. Each one end of the pivot member 52 and the pivot plate 59 is pivotally supported to the stopper receiver 38 in the vicinity of the shaft 22, and the second stopper bolt 47 is abuttable on each free end thereof. The pivot member 52 and the pivot plate 59 are pivotally movable about a common pivot axis independently as shown in FIG. 21.

The horizontal pivot member 52 corresponds to the pivot member 42 of the first embodiment. Like the pivot member 42, the horizontal pivot member 52 can be interposed between the stopper receiver 38 and the second stopper bolt 47 or can be displaced therefrom. The horizontal pivot plate 59 corresponds to the plate 39 of the first embodiment. Like the plate 39, the horizontal pivot plate 59 can be interposed between the stopper receiver 38 and the second stopper bolt 47 and can be displaced therefrom. Thus, a shallow groove and a groove of a predetermined depth can easily be formed in the obverse surface of a thick workpiece W or a thin workpiece W, as with the slide type miter saw 1 according to the first embodiment. The horizontal pivot plate serves as a blade-positioning member.

A slide type miter saw according to a third embodiment of the present invention will next be described with reference to FIGS. 22 to 24. The third embodiment differs from the first embodiment in the following aspects. First, a horizontal pivot plate 69 is used instead of the plate 39 of the first embodiment. Second, a stopper holder 65 corresponding to the stopper holder 45 of the first embodiment is not pivotally movable.

Third, a recess 38*a* is formed in the stopper receiver 38, and a pivotally movable cover 68 is provided for selectively closing the recess 68*a*.

Figure 22:
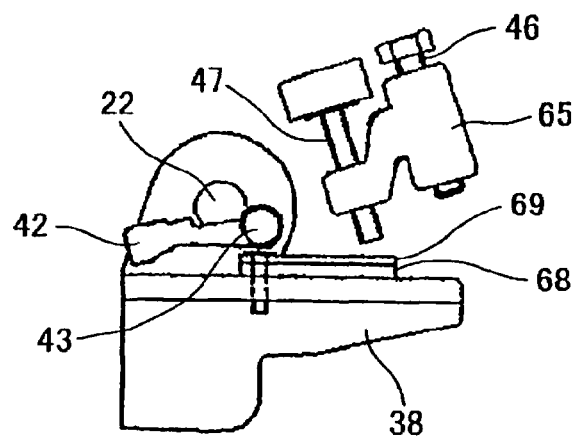
FIG. 22 is a side view showing an essential portion of a slide type miter saw according to a third embodiment of the present invention, and illustrating a horizontal pivot plate and a cover those superimposed with a stopper receiver.
Figure 23:
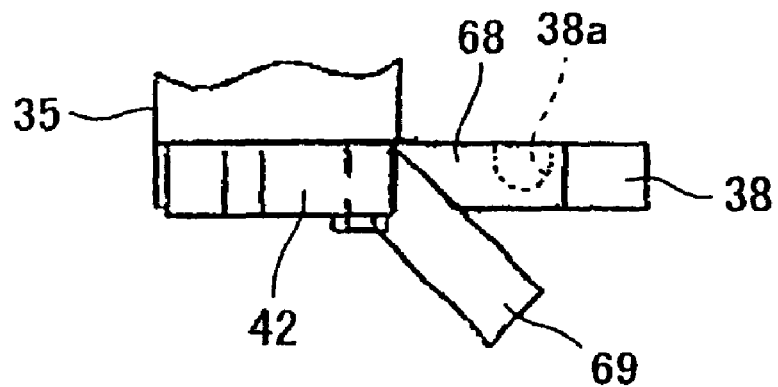
FIG. 23 is a plan view showing the essential portion of the slide type miter saw according to the third embodiment, and depicting the cover superimposed with the stopper receiver thus closing a recess, and the horizontal pivot plate offset from the cover.
Figure 24:
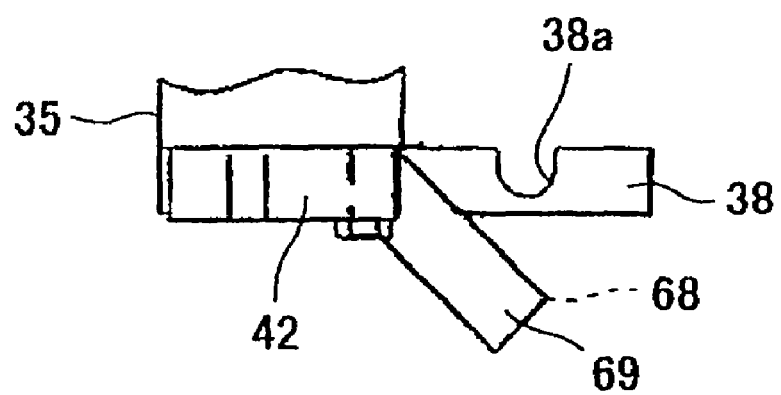
FIG. 24 is a plan view showing the essential portion of the slide type miter saw according to the third embodiment, and illustrating the cover and horizontal pivot plate those offset from the stopper receiver.

As shown in FIGS. 22 to 24, the cover 68 and the horizontal pivot plate 69 are in rectangular shape and have thickness different from each other. The cover 68 has a thickness of a few millimeters, and the horizontal pivot plate 69 has a thickness of about 1 mm to 2 mm. The cover 68 is laid on the stopper receiver 38, and the horizontal pivot plate 69 is laid on the cover 68. Each one end of the cover 68 and the horizontal pivot plate 69 is pivotally supported to the stopper receiver 38 in the vicinity of the shaft 22, and the second stopper bolt 47 is abuttable on the free end of the horizontal pivot plate 69. As shown in FIGS. 23 and 24, the horizontal pivot plate 69 and the cover 68 are independently pivotally movable about a common pivot axis. The horizontal pivot plate 69 corresponds to the plate 39 of the first embodiment and to the horizontal pivot plate 59 of the second embodiment. The cover 68 functions as an abutment section on which the second stopper bolt 47 is abuttable.

The stopper holder 65 is an integration of the stopper-bolt retainers 44 and stopper holder 45 of the first embodiment. The stopper holder 65 is therefore secured to the circular-saw unit 20 and immovable with respect to the unit 20. The first stopper bolt 46 always remains farther from the shaft 22 than the second stopper bolt 46 to the shaft 22 which pivotally supports the circular-saw unit 20

The recess 38*a* of the stopper receiver 38 is positioned in alignment with the second stopper bolt 47. The recess 38*a* extends downwards from above in FIG. 24, that is, the recess 38*a* is open at right side of the stopper receiver 38. The distal end of the second stopper bolt 47 can extends through the recess 38*a* when the circular-saw unit 20 is pivotally moved downwards while both the cover 68 and the horizontal pivot plate 69 are displaced from the recess 38*a*. Hence, the second stopper bolt 47 does not interfere with the stopper receiver 38. In this case, the distal end of the first stopper bolt 46 is abuttable on the stopper receiver 38, inhibiting the circular-saw unit 20 from pivotally moving downward below its lowermost position.

While the cover 68 is covering the recess 38*a* and the horizontal pivot plate 69 remains offset from the cover 68 as illustrated in FIG. 23, the distal end of the second stopper bolt 47 abuts on the cover 68 when the circular-saw unit 20 is pivotally moved downwards. In this state, if the circular-saw unit 20 is slidingly moved backwards, a shallow groove can be formed in the obverse surface of the workpiece W.

A slide type miter saw according to a fourth embodiment of the present invention will be described with reference to FIGS. 25 to 28. The fourth embodiment differs from the first embodiment only in that the saw according to the fourth embodiment has no component equivalent to the plate 39 of the first embodiment. Therefore forming a shallow groove is difficult in the fourth embodiment. Nonetheless, this configuration is sufficient to perform formation of a groove of a desired depth.

Figure 25:
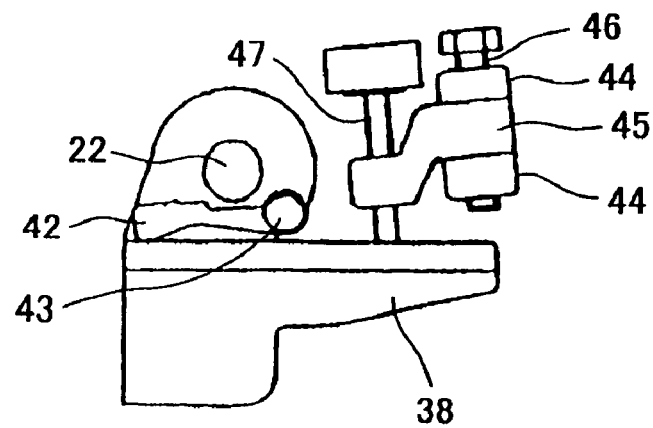
FIG. 25 is a side view showing an essential portion of a slide type miter saw according to a fourth embodiment of the present invention, and showing a pivot member held at its second pivot position.
Figure 26:
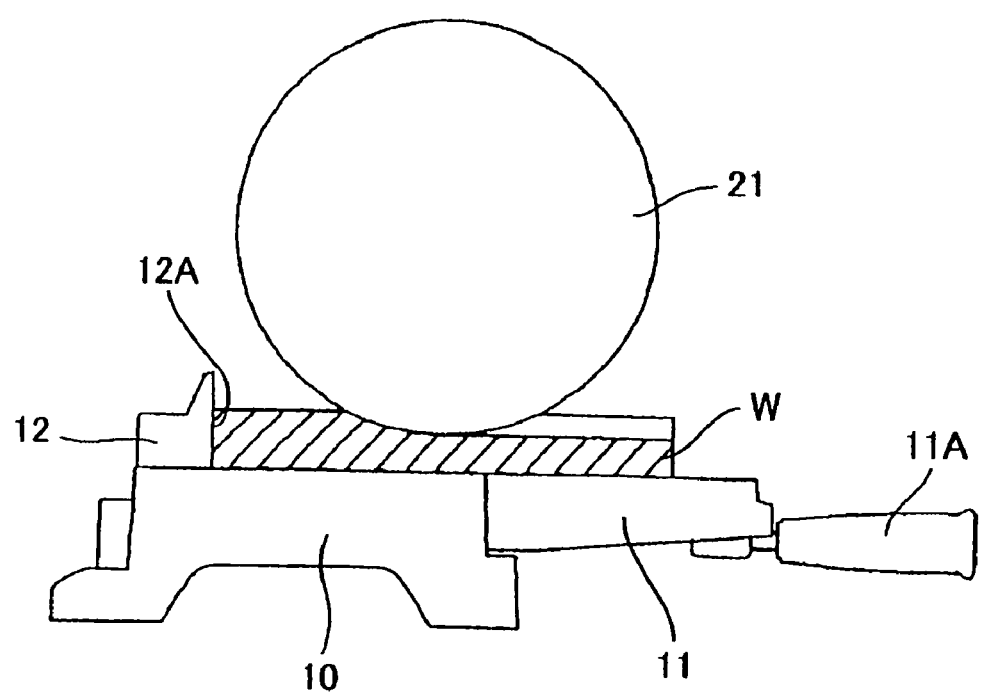
FIG. 26 is a view showing a state of forming a groove of a desired depth in the obverse surface of a thin workpiece with the circular saw blade in the slide type miter saw according to the fourth embodiment.

For forming a groove of a desired depth in the obverse surface of a relatively thin workpiece W, the pivot member 42 is pivotally moved to the second pivot position where the pivot member 42 does not abut on the stopper receiver 38 as is illustrated in FIG. 25. In this state, the stopper holder 45 is pivotally moved to the first pivot position, where the second stopper bolt 47 lies close to the shaft 22. Then, the second stopper bolt 47 is rotated about its axis for moving the second stopper bolt 47 in its axial direction. The second stopper bolt 47 is thereby set the position shown in FIG. 26 so that a groove of the desired depth can be formed. Next, the circular-saw unit 20 is pivotally moved downwards against the biasing force of the spring 23 and then moved rearward. As a result, a groove of the desired depth can be formed in the obverse surface of the thin workpiece W as depicted in FIG. 26.

Figure 27:
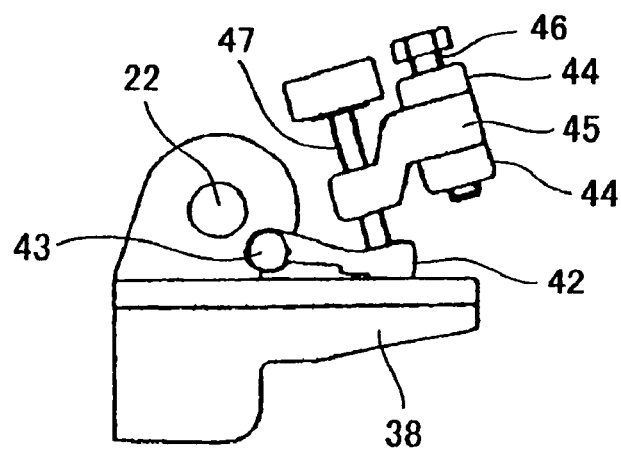
FIG. 27 is a side view showing the essential portion of the slide type miter saw according to the fourth embodiment, and showing the pivot member held at its first pivot position.
Figure 28:
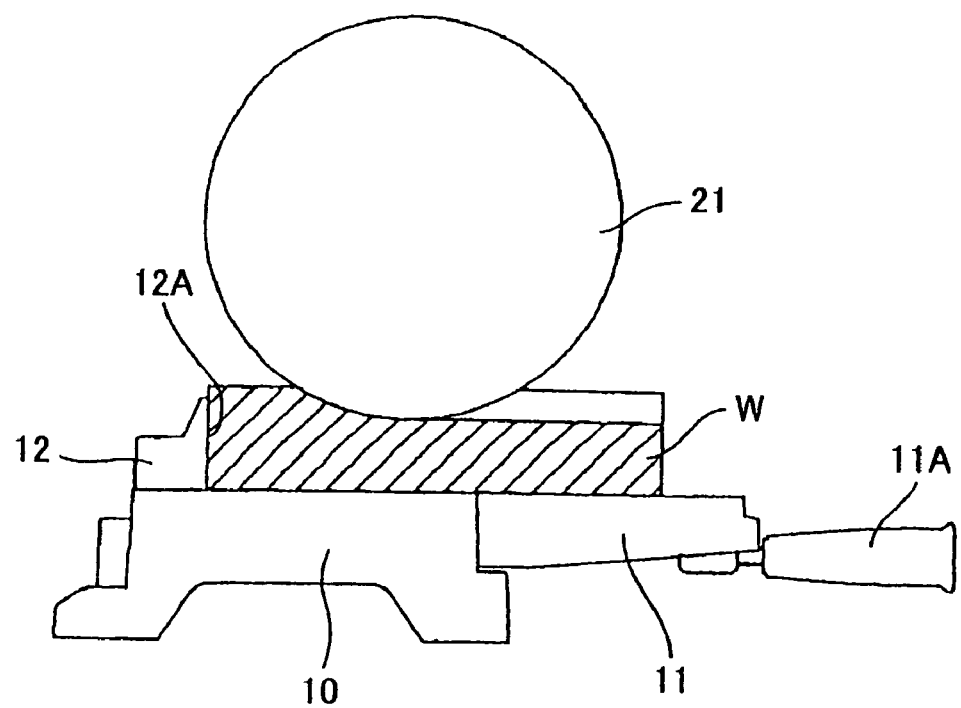
FIG. 28 is a view showing a state of forming a groove of a desired depth in the obverse surface of a thick workpiece with the circular saw blade in the slide type miter saw according to the fourth embodiment.

For forming a groove of a desired depth in the obverse surface of a relatively thick workpiece W, the pivot member 42 is pivotally moved to the first pivot position where the pivot member 42 abuts on the stopper receiver 38 as shown in FIG. 27. In this state, the stopper holder 45 is pivotally moved to the first pivot position where the second stopper bolt 47 lies close to the shaft 22. Then, the second stopper bolt 47 is rotated about its axis for moving the second stopper bolt 47 in its axial direction. The second stopper bolt 47 can be set at the position shown in FIG. 28 so that a groove of the desired depth can be formed. With this state, the circular-saw unit 20 is pivotally moved downwards against the biasing force of the spring 23 and then moved rearward. As a result, a groove of the desired depth can be formed in the obverse surface of the thick workpiece W as illustrated in FIG. 28.

A slide type miter saw according to a fifth embodiment of the present invention will be described with reference to FIGS. 29 to 32. The fifth embodiment differs from the first embodiment in the following points. First, the fifth embodiment has no component equivalent to the pivot member 42 of the first embodiment. Second, a thick plate 72 that is much thicker than the plate 39 is provided instead of the plate 39 of the first embodiment. The thick plate 72 functions as the pivot member 42 of the first embodiment. Hence, forming a shallow groove is difficult in the fifth embodiment. Nevertheless, the fifth embodiment is sufficient for forming a groove of a desired depth. The thick plate 72 functions as a horizontally movable member.

Figure 29:
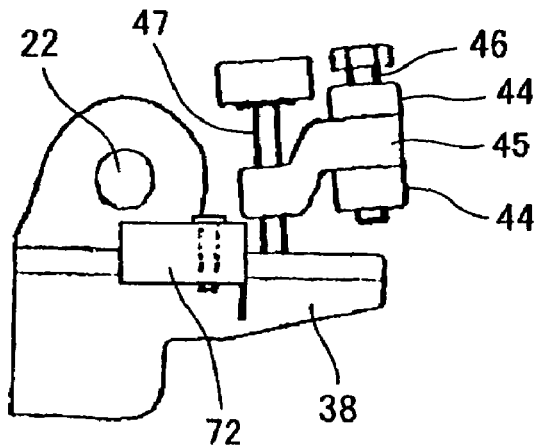
FIG. 29 is a side view showing an essential portion of a slide type miter saw according to a fifth embodiment of the present invention, and showing a thick plate held at its second position.
Figure 30:
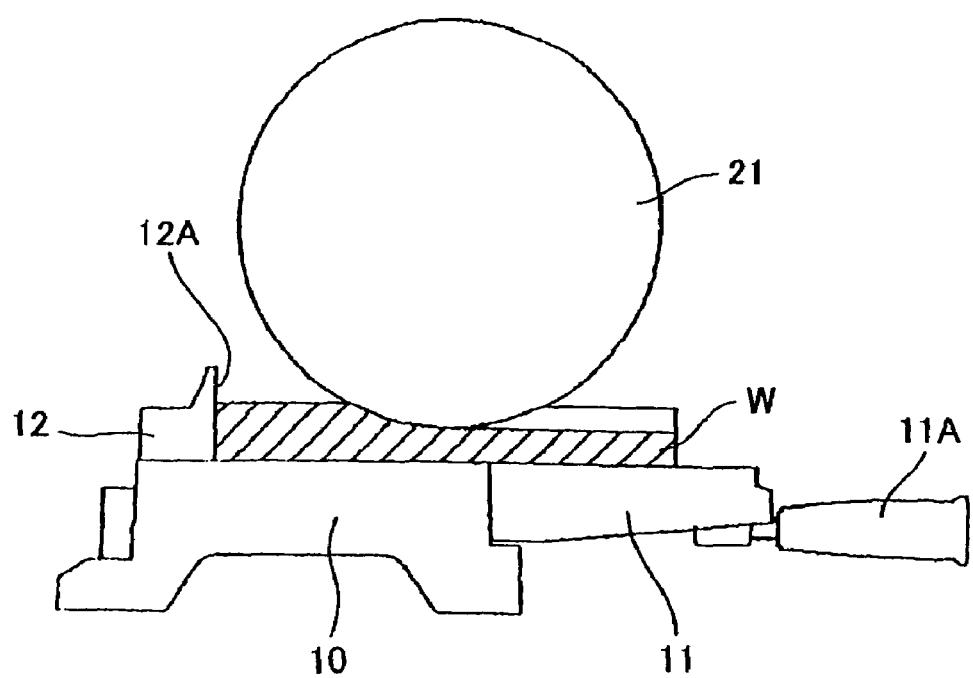
FIG. 30 is a view showing a state of forming a groove of a desired depth in the obverse surface of a thin workpiece with the circular saw blade in the slide type miter saw according to the fifth embodiment.

For forming a groove of a desired depth in the obverse surface of a relatively thin workpiece W, the thick plate 72 is moved to its second position where the thick plate 72 does not oppose the distal end of the second stopper bolt 47 as illustrated in FIG. 29. In this condition, the stopper holder 45 is pivotally moved to the first pivot position where the second stopper bolt 47 lies close to the shaft 22. Then, the second stopper bolt 47 is rotated about its axis for moving the second stopper bolt 47 in its axial direction. Thus, the second stopper bolt 47 can be set at the position shown in FIG. 30 so that a groove of the desired depth can be formed. Next, the circular-saw unit 20 is pivotally moved downwards against the biasing force of the spring 23 and then moved rearward. As a result, a groove of the desired depth is formed in the obverse surface of the thin workpiece W as shown in FIG. 30.

Figure 31:
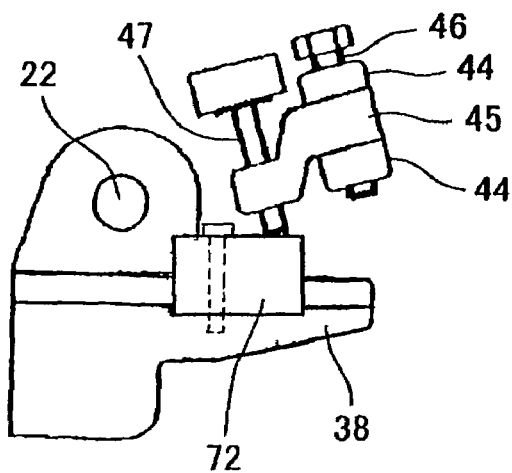
FIG. 31 is a side view showing the essential portion of the slide type miter saw according to the fifth embodiment, and showing the thick plate held at its first position.
Figure 32:
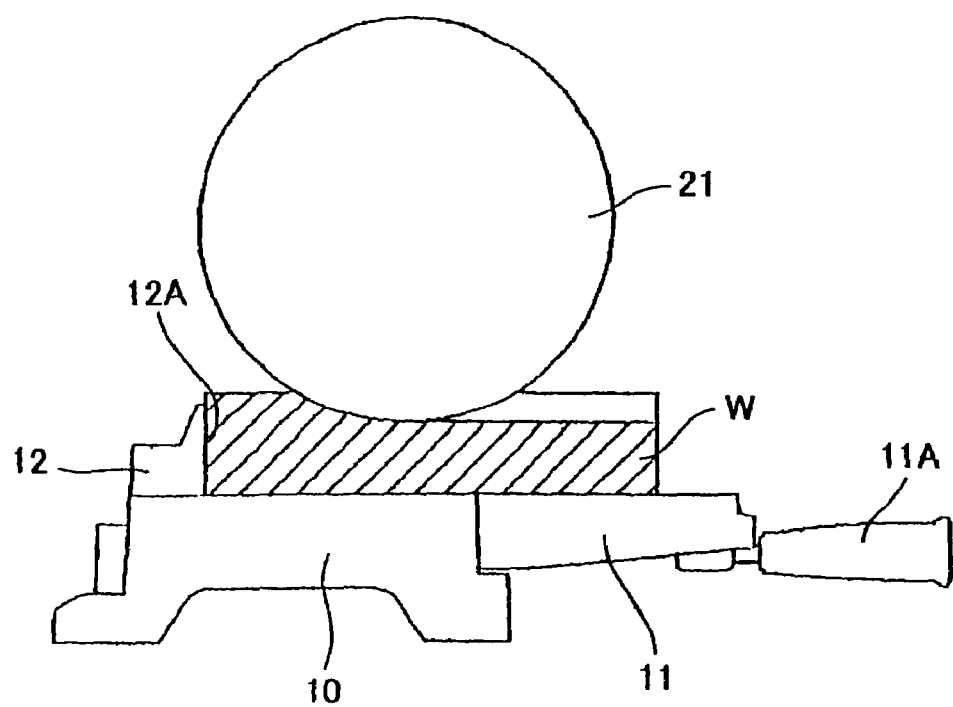
FIG. 32 is a view showing a state of forming a groove of a desired depth in the obverse surface of a thick workpiece with the circular saw blade in the slide type miter saw according to the fifth embodiment.
Figure 33:
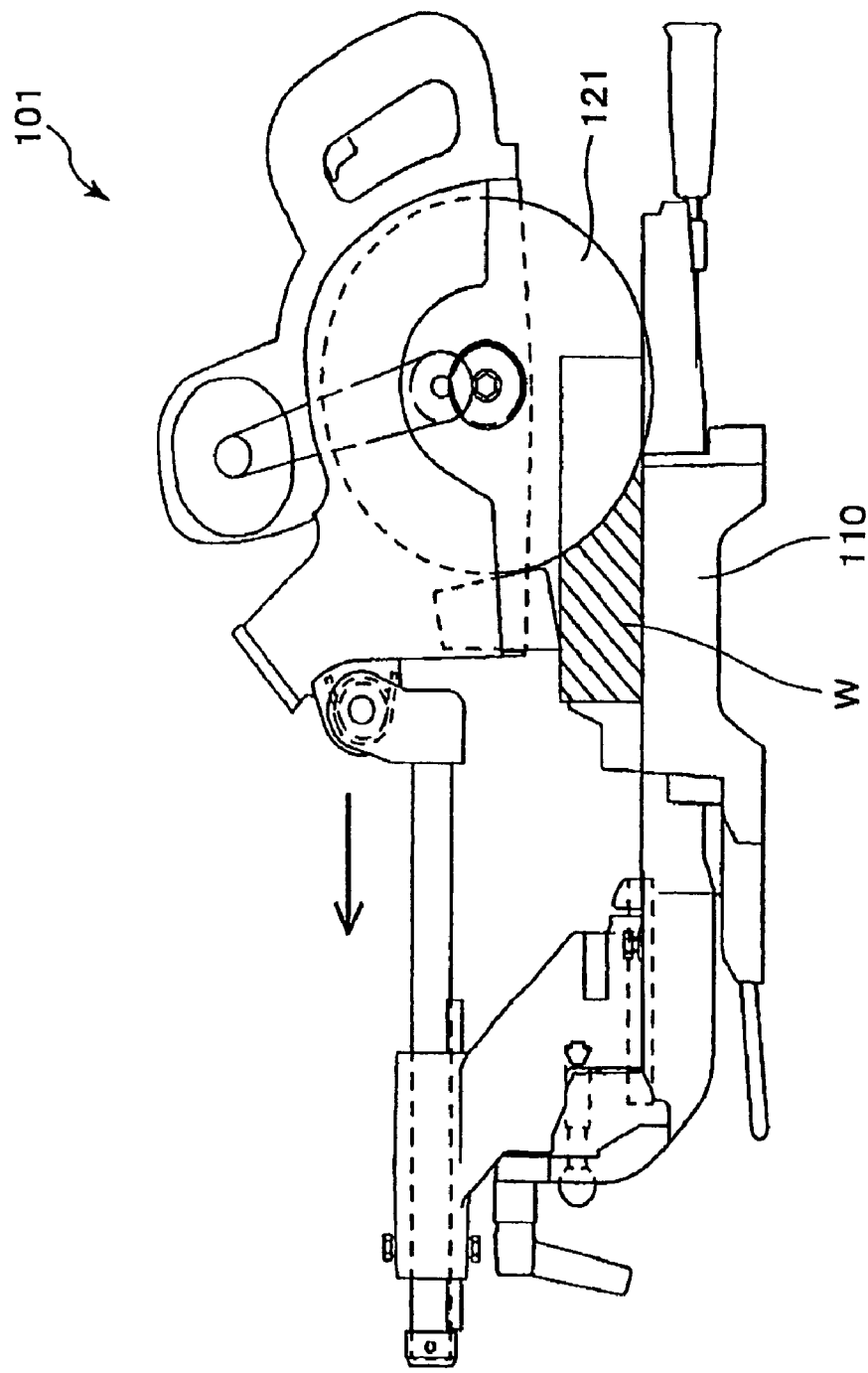
FIG. 33 is a side view showing a conventional slide type miter saw.

For forming a groove of a desired depth in the obverse surface of a relatively thick workpiece W, the thick plate 72 is moved to the first pivot position where the thick plate 72 can oppose to the distal end of the second stopper bolt 47 as shown in FIG. 31. In this state, the stopper holder 45 is pivotally moved to the first pivot position where the second stopper bolt 47 lies close to the shaft 22. Then, the second stopper bolt 47 is rotated about its axis for moving the second stopper bolt 47 in its axial direction. The second stopper bolt 47 is thereby set at the position shown in FIG. 32 so that a groove of the desired depth can be formed. Next, the circular-saw unit 20 is pivotally moved downwards against the biasing force of the spring 23 and then moved rearward. Thus, the slide type miter saw can form a groove of the desired depth in the obverse surface of the thick workpiece W as illustrated in FIG. 32.

While the invention has been described in detail and with reference to the specific embodiments thereof, it would be apparent to those skilled in the art that various changes and modifications may be made therein without departing from the spirit and scope of the invention. For example, although the above-description pertains to so-called right-angle cutting only, the slide type miter saw according to the invention can also accomplish other cuttings, such as slide cutting, angle cutting and slant cutting, or composite cutting, i.e., a combination of angle cutting and slant cutting.

Moreover, as a modification, the stopper holder 45 and the second stopper bolt 47 are dispensed with. If this is the case, a part of the stopper bolt retainer is used as a first abutment member abuttable on the first abutment section of the stopper receiver, and the first stopper bolt is used as a second abutment member abuttable on the second abutment section of the stopper receiver.

What is claimed is:

1. A slide type miter saw comprising:
a base on which a workpiece is to be mounted;
a support unit slidably movable in frontward/rearward direction with respect to the base;
a circular-saw unit pivotally connected to the support unit by a pivot shaft, a circular-saw blade being attached to the circular-saw unit;
an abutment unit provided on the circular-saw unit, and comprising:
a first abutment section; and
a second abutment section having an abutment shaft extending in a direction substantially perpendicular to the pivot shaft and movable in an axial direction of the abutment shaft relative to the first abutment section; and
an abutment receiving unit provided on the support unit for determining a lowermost position of the circular saw blade, the abutment receiving unit comprising:
a first abutment receiving section on which the first abutment section is abuttable when the circular-saw unit pivotally moves toward the base;
a second abutment receiving section on which the second abutment section is abuttable when the circular-saw unit pivotally moves toward the base; and
a third abutment receiving section having a predetermined thickness and selectively movable to a position superposed with the second abutment receiving section so that the second abutment section is selectively abuttable on the third abutment receiving section when the circular-saw unit pivotally moves toward the base.

2. The slide type miter saw as claimed in claim 1, wherein the second abutment section is movable between a first position and a second position relative to the circular saw unit, only the first abutment section being abuttable on the first abutment receiving section when the second abutment section lies in the first position, and only the second abutment section being abuttable on one of the second abutment receiving section and the third abutment receiving section when the second abutment section lies in the second position.

3. The slide type miter saw as claimed in claim 2, wherein the second abutment receiving section is flush with the first abutment receiving section in an identical horizontal plane.

4. The slide type miter saw as claimed in claim 2, wherein the third abutment receiving section comprises a pivot member pivotally movably connected to the support unit, the pivot member being movable between a first pivot position providing a direct contact of the abutment shaft of the second abutment section with the pivot member and a second pivot position permitting the abutment shaft to directly contact with the second abutment receiving section.

5. The slide type miter saw as claimed in claim 1, wherein the second abutment receiving section is flush with the first abutment receiving section in an identical horizontal plane, and
wherein the third abutment receiving section comprises a horizontally movable member movable along a surface of at least the second abutment receiving section, the horizontally movable member being movable between a first slide position providing a direct contact of the abutment shaft of the second abutment section with the horizontally movable member and a second slide position permitting the abutment shaft to directly contact with the second abutment receiving section.

6. The slide type miter saw as claimed in claim 1, wherein the third abutment receiving section comprises a horizontally movable member having an upper surface positioned at a level higher than an upper surface of the second abutment receiving section, the horizontally movable member being slidable between a first slide position and a second slide position along the upper surface of the second abutment receiving section, the first slide position permitting the abutment shaft of the second abutment section to directly contact with the upper surface of the horizontally movable member for positioning a lowest part of the circular saw blade coincident with an upper surface of the workpiece, and the second slide position permitting the abutment shaft to directly contact with the second abutment receiving section for automatically defining a depth of a groove to be formed on the workpiece.

7. The slide type miter saw as claimed in claim 6, wherein the third abutment receiving section further comprises a pivot member pivotally movably connected to the support unit, the pivot member being movable to a position to contact with the upper surface of the horizontally movable member while the horizontally movable member remains at the first slide position for positioning a lowest part of the circular saw blade coincident with an upper surface of the workpiece, and the pivot member being also movable to another position to directly contact with the second abutment receiving section avoiding interference with the horizontally movable member as a result of shifting the horizontally movable member to the second slide position for automatically defining a depth of a groove to be formed on the workpiece.

8. The slide type miter saw as claimed in claim 1, wherein the third abutment receiving section comprises a pivotable block pivotally movable in a horizontal plane for selectively superposing with the second abutment receiving section.

9. The slide type miter saw as claimed in claim 8, wherein the third abutment receiving section further comprises a blade position regulating plate pivotally movable in a horizontal plane and disposed upon the pivotable block for selectively superposing with the pivotable block.

10. The slide type miter saw as claimed in clam 1, wherein the base has a rear end; and the miter saw further comprising:
a holder standing upright at the rear part of the base; and
a sliding member supported by the holder and slidably movable in frontward/rearward direction with respect to the base, the sliding member having a front part, the support unit being provided at the front part of the sliding member.

11. A slide type miter saw comprising:
a base on which a workpiece is to be mounted;
a support unit slidably movable in frontward/rearward direction with respect to the base;
a circular-saw unit pivotally connected to the support unit by a pivot shaft, a circular-saw blade being attached to the circular-saw unit, the circular-saw unit being pivotally movable between an upper position away from the base and a lower position toward the base;

an abutment unit provided on the circular-saw unit and extending in a direction substantially perpendicular to the pivot shaft and pivotable with respect to the circular-saw unit in a direction toward and away from the pivot shaft;

an abutment receiving unit provided on the support unit for determining a lowermost position of the circular saw blade when the abutment unit abuts the abutment receiving unit as a result of pivot movement of the circular saw blade toward the base; and an auxiliary abutment receiving unit provided on the support unit and selectively interposed between the abutment unit and the abutment receiving unit when the circular-saw unit pivotally moves toward the base for providing abutment of the abutment unit on a selected one of the abutment receiving unit and the auxiliary abutment receiving unit;

wherein the abutment unit and the auxiliary abutment receiving unit are movable with respect to an associated one of the circular-saw unit and the support unit, the abutment unit being offset from the abutment receiving unit as a result of movement of at least one of the abutment unit and the auxiliary abutment receiving unit when the circular-saw unit pivotally moves toward the base; and wherein when the circular-saw unit is pivotally moved to the lower position toward the base, the abutment unit is movable to one position where the abutment unit is out of interference with the auxiliary abutment receiving unit and the abutment receiving unit, and to another position where either of abutment of the abutment unit on the auxiliary abutment receiving unit or abutment of the abutment unit on the abutment receiving unit is selectable, so that at least three cutting depths for the circular saw blade are settable for a cutting operation by the circular saw blade.

12. The slide type miter saw as claimed in claim 11, wherein the abutment unit comprises an abutment section, and a holding member supported to the circular-saw unit for holding the abutment section, the holding member being pivotally movable between a first pivot position permitting the abutment section to contact with one of the abutment receiving unit and the auxiliary abutment receiving unit and a second pivot position permitting the abutment section to be out of contact from the abutment receiving unit and the auxiliary abutment receiving unit.

13. The slide type miter saw as claimed in claim 11, wherein the auxiliary abutment receiving unit comprises a pivot member having a support shaft extending in substantially parallel with the pivot shaft and pivotally movable about the support shaft between a first position and a second position, in the first position the pivot member being mounted on the abutment receiving unit for allowing the abutment unit to directly contact with the pivot member, and in the second position the pivot member being positioned away from the abutment receiving unit to avoid contact of the abutment unit with the pivot member.

14. The slide type miter saw as claimed in claim 11, wherein the auxiliary abutment receiving unit comprises a movable member slidably movable along the abutment receiving unit between a first position and a second position, in the first position the movable member being interposable between the abutment unit and the abutment receiving unit, and in the second position the movable member being out of contact from the abutment unit.

15. The slide type miter saw as claimed in claim 11, wherein the auxiliary abutment receiving unit comprises:
a first section slidably movable along the abutment receiving unit between a first position and a second position, in the first position the first section being interposable between the abutment unit and the abutment receiving unit, and in the second position the first section being out of contact from the abutment unit; and a second section movable among a first location where the second section is interposable between the abutment unit and the abutment receiving unit allowing the abutment unit to abut on the second section, a second location avoiding contact of the abutment unit with the second section, and a third location where the second section is interposable between the abutment unit and the abutment receiving unit and is superposed with the first section, the first section having a thickness smaller than that of the second section.

16. The slide type miter saw as claimed in claim 11, wherein the auxiliary abutment receiving unit comprises:
a pivot member pivot member having a support shaft extending in substantially parallel with the pivot shaft and pivotally movable about the support shaft between a first position and a second position, in the first position the pivot member being mounted on the abutment receiving unit for allowing the abutment unit to directly contact with the pivot member, and in the second position the pivot member being positioned away from the abutment receiving unit to avoid contact of the abutment unit with the pivot member; and a movable member slidably movable along the abutment receiving unit between a first place and a second place, in the first place the movable member being interposable between the abutment unit and the abutment receiving unit, and in the second place the movable member being out of contact from the abutment unit, the pivot member being selectively interposable between the abutment unit and the movable member.

17. The slide type miter saw as claimed in claim 16, wherein the movable member has a thickness capable of providing a difference in a distance ranging from 1 mm to 2 mm between a first distance and a second distance, the first distance being measured between a lowest part of the circular saw blade and the base when the abutment unit abuts on the movable member while the movable member is at the first place as a result of pivotal movement of the circular-saw unit toward the base, and the second distance being measured between the lowest part of the circular saw blade and the base when the abutment unit abuts the abutment receiving unit while the movable member is at the second place as a result of pivotal movement of the circular-saw unit toward the base.

18. The slide type miter saw as claimed in claim 11, wherein the at least three cutting depths are predetermined cutting depths corresponding to the one position and the another position.

19. The slide type miter saw as claimed in claim 18, wherein the at least three predetermined cutting depths are obtainable without performing at least one of a screwing and unscrewing operation of the abutment unit.

* * * * *